July 11, 1939.
C. L. GOODRUM ET AL
2,165,925
AUTOMATIC BILLING SYSTEM
Filed Nov. 15, 1933
11 Sheets-Sheet 1
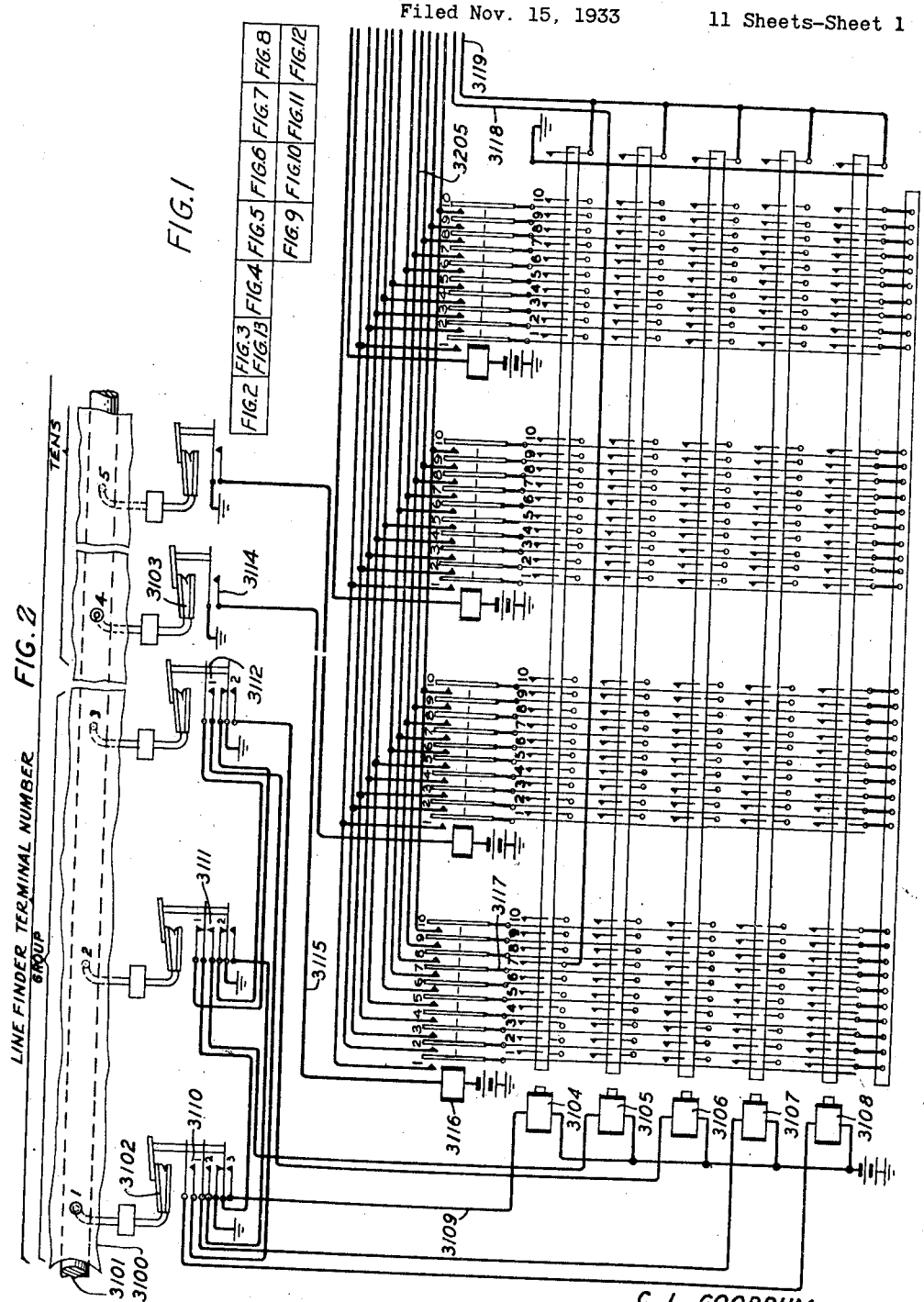
INVENTORS: C. L. GOODRUM
E. E. HINRICHSEN
L. KELLER
BY P. C. Smith
ATTORNEY July 11, 1939.   C. L. GOODRUM ET AL   2,165,925
AUTOMATIC BILLING SYSTEM
Filed Nov. 15, 1933    11 Sheets-Sheet 2
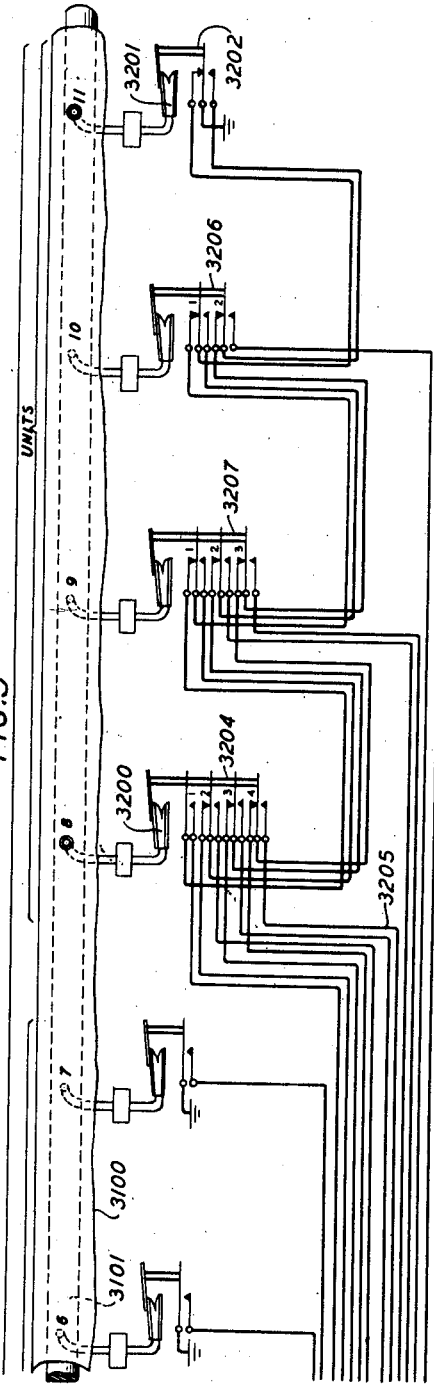
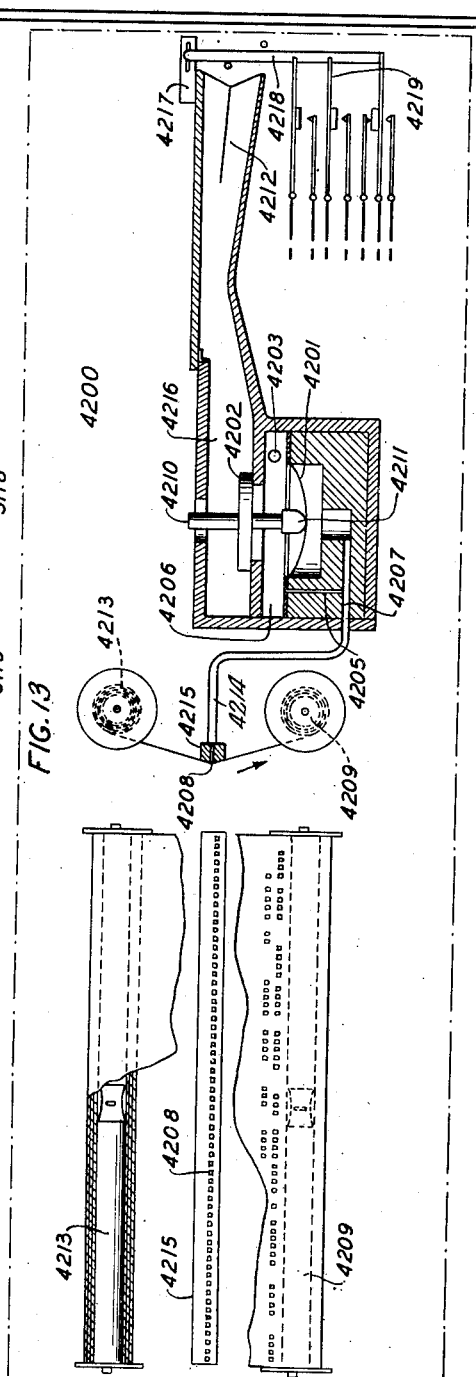
INVENTORS: C. L. GOODRUM
E. E. HINRICHSEN
L. KELLER
BY P. C. Smith
ATTORNEY

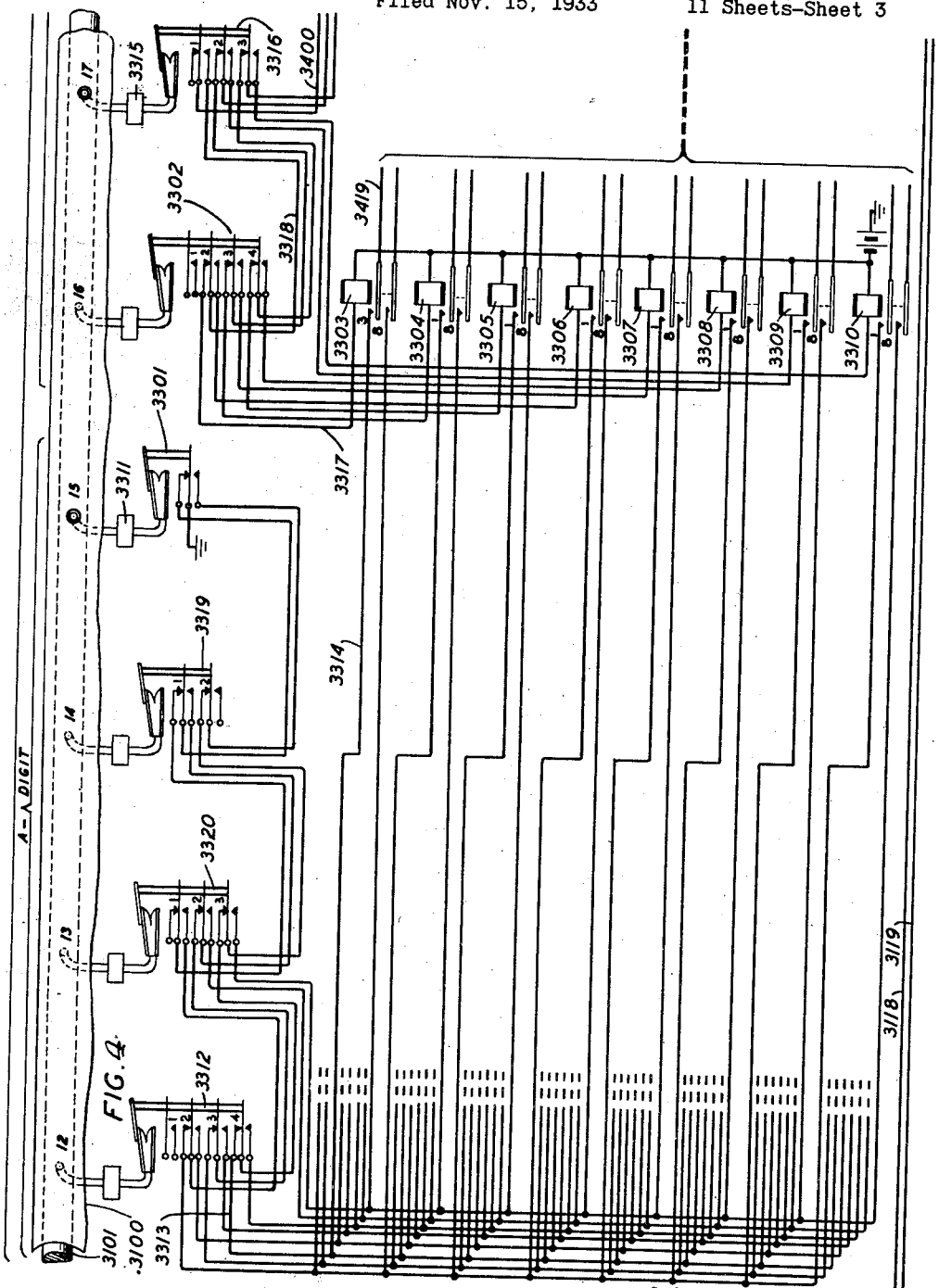

July 11, 1939.    C. L. GOODRUM ET AL    2,165,925
AUTOMATIC BILLING SYSTEM
Filed Nov. 15, 1933    11 Sheets-Sheet 4

INVENTORS: C. L. GOODRUM
E. E. HINRICHSEN
L. KELLER
BY P. C. Smith
ATTORNEY

INVENTORS: C. L. GOODRUM
E. E. HINRICHSEN
L. KELLER
BY P. C. Smith
ATTORNEY

July 11, 1939.  C. L. GOODRUM ET AL  2,165,925
AUTOMATIC BILLING SYSTEM
Filed Nov. 15, 1933   11 Sheets-Sheet 11

INVENTORS: C.L.GOODRUM
E.E.HINRICHSEN
L.KELLER
BY P.C.Smith
ATTORNEY

Patented July 11, 1939

2,165,925

UNITED STATES PATENT OFFICE 2,165,925

AUTOMATIC BILLING SYSTEM

Charles L. Goodrum, New York, N. Y., Edward E. Hinrichsen, Pasadena, Calif., and Leo Keller, New York, N. Y., assignors to Bell Telephone Laboratories, Incorporated, New York, N. Y., a corporation of New York Application November 15, 1933, Serial No. 698,046

7 Claims. (Cl. 235—61.10)

This invention relates to automatic billing systems and more particularly to a system adapted for use with telephone lines in which a continuous record of the details of calls, made from said lines over a stated billing period, operates translating apparatus to make a continuous but individual record of all calls for said lines and which record may thereafter be used to operate tabulating and printing machinery for making a tabulated, computed, and printed bill for the line to which said record appertains.

At the present time it is well known that, on some classes of subscribers' lines such as, for example, individual message rate lines, charges for telephone service are usually made by operating a line meter regardless of the character of the telephone system of which the line forms a part and that said meter is operated when the called subscriber removes his receiver from the switchhook as evidence of the completed connection.

Furthermore, recent advances in the development of telephone systems make it possible for the calling subscriber to dial directly the office and number of a wanted subscriber located in that section of the "toll" area which is immediately contiguous to the local area and for which the charge for the connection is a multiple of the base rate charge of a strictly local call. In such a connection, the meter of the calling line is operated a plurality of times on the initial charge period when the charge is a multiple of the standard local rate and also a number of times thereafter for each overtime period depending upon the multiple of the local standard rate used as a charge for the overtime period. At the end of each month, or whatever interval is used for billing purposes, each line meter is read and by subtracting the reading of the previous billing period from this reading, the total number of local charges over the period is determined. This total comprises not only the separate charges for strictly local calls but also the equivalent, in terms of the base local rate, of charges for other calls completed in the immediate toll area and for which the subscriber is billed in bulk; that is, without an itemized identification of such toll calls to accompany the monthly bill.

This method of billing subscribers, while practically satisfactory for local calls and for such toll calls as can be billed in bulk, is impractical for use where the equipment of the telephone plant is such as will permit subscribers to establish connections with other subscribers located in the more remote toll areas on a direct dialing basis. As is well known, toll and long distance calls are timed and ticketed by a recording operator which is done to preserve a record of the identification of the calling and called lines as well as the duration of conversation in order that such calls may be correctly itemized on the calling subscriber's bill. Obviously, as long as a subscriber's line has to be routed to an operator's position before it can be extended to a toll or long distance point, direct dialing by the subscriber to such a distant point with all the economies of operation and efficiency of service incident to such automatic operation, will be impossible.

Our invention is intended to overcome this obstacle. By means of a common record of all calls for a group of lines, made in accordance with the methods and means disclosed in the co-pending application of C. L. Goodrum, Serial No. 695,999 filed October 31, 1933, translating apparatus can be operated which will make a separate record for each line in the group and this record may thereafter be use with suitable tabulating printing devices to produce the subscriber's bill.

The advantages of the invention are manifest. First of all, it permits the extension of direct dialing to more distant points without the delays incident to the making out of tickets when the calls are established manually, thereby eliminating the possibility of errors incidental to manual operation; it further preserves a record of the detail of each call as made by the subscriber, thereby eliminating all possibility of misunderstanding between the subscriber and the operating company when the former complains of being charged for calls he alleges he did not make; and it further eliminates the costly routine of periodical metered readings for local calls and other calls charged for in multiples of local call base rate, thereby eliminating the bookkeeping effort necessary to translate the data into monthly bills. In other words, the superiority of our invention, as applied to telephone billing practices, is to be found in the possibility of broadening the potential use of automatic telephone equipment and of reducing the cost of operating the clerical branch of the telephone plant.

The present invention, therefore, has for its object the provision of a system of apparatus and circuits responsive to a record of calls made from a group of lines, for the purpose of making a separate record for each line. As already mentioned, this separate record may then be used to operate a suitable tabulating device which produces a bill of charges for the calls recorded thereon. The broad aspects of the invention form the basis of an application of C. L. Goodrum mentioned above and filed on October 31, 1933, as before mentioned. The present invention relates to a translating device adapted to produce an individual record for each subscriber from a common record for a group of subscribers, while a species of tabulating mechanisms adapted to produce a bill from said individual record is covered by our divisional application Serial No. 178,636 filed December 8, 1937.

The general principle upon which the invention operates is the making, upon a suitable medium, of a record of each call by means of a recording mechanism common to the group of lines, as described in the above-mentioned application of C. L. Goodrum. This record includes for each call recorded, the date, an identifying designation of the calling line, the code of the called office, the number of the called station, the duration of the conversation, and such other items as are found necessary for billing purposes. Ordinarily, most of the information is required for toll calls only since an itemized history of such calls is furnished the subscriber with his bill. This call record, as described in the above-mentioned Goodrum application, is a wide punched tape somewhat in the order of a player piano roll and the perforations required to record all the necessary information for billing purposes are made by a punching machine having a plurality of magnets which operate simultaneously to perforate the record on the tape in order that the time required to punch the record shall be as small as possible.

Since, according to the above-mentioned Goodrum application, the perforating machine is common to a group of lines such as, for example, those terminating on a line-finder frame, the record strip made by the machine contains the perforations of all the calls made by all the lines in the group, not segregated together with respect to each of the lines from which the calls are made, but recorded indiscriminately for each line, in the order of sequence in which the calls are made throughout the billing period. One feature of the present invention, therefore, has to do primarily with the means necessary to make one record for each line out of the one common record for all lines and to include in such record every item of information that may have to appear on the subscriber's bill. Such means must necessarily have other means for translating the called office code and the time of conversation for each call into the proper charge for each call as well as means for suppressing such parts of the common record as relate to information that is not to appear on the bill so that what appears on the individual line record is only the information which is to be utilized by the tabulating and printing mechanism for printing or tabulating each item appearing on said record.

The equipment for sorting out the calls made by the various lines of the group from the common record strip or primary tape as it is hereinafter called comprises what is herein called a translator having a suitable number of tape perforating machines controlled by it, there being, according to one preferred arrangement, one translator per calling line group with as many perforating machines for each translator as there are lines in the group so that a single passage of the primary tape strip through the translator will suffice to make a separate and individual record for each line. Inasmuch as the primary tape is in the form of a continuous roll having perforations thereon, the translator contains a series of pneumatic devices which are responsive to the perforations in the primary tape as the record of each call on said tape comes into coincidence with the separate channels of the pneumatic devices. When the perforating machine described in the above-mentioned Goodrum application which makes the primary tape is different from the one therein described, the translator will contain, of course, not the pneumatic devices which respond to a perforated record, but whatever other device will be responsive to the character of the record made on the strip by said other recording mechanism. The response of the translator to the identification number of the calling line causes the selection of the proper perforating machine in the translator, thus distributing the registration of the calls to the separate recording machines appertaining to the different lines of the group.

Before analyzing the primary tape, however, it is necessary to identify the so-called directory number of the calling line with its line-finder or terminal code number, the relation of which to the directory number is purely arbitrary and this is done by means of a master record, as hereinafter described, which is run through the translator ahead of the primary tape. This causes the translator to punch on each individual line record the number of the line and such information as to the class of service to which it is entitled as is necessary for a proper computation of the bill.

The pneumatic devices in the translator which respond to the called office code and the elapsed time of a call, control the operation of what is herein called the translator computer which computes the charge for said call and determines whether or not the call is to be itemized on the bill. As soon as this translation is made, the charge and, if the call is to be itemized, the date and office code and number of the calling line, are punched on the line record by that perforating machine of the translator which was selected by the calling line terminal number.

The passage of the primary tape through the translator thus produces a set of individual line records, each of which, in the preferred embodiment of the invention, contains a record of local calls merely as individual charges and toll calls in detail. The calls for each line will, of course, appear on these separate line records in the order in which they are made and in a code suitable for tabulating and printing operations.

The separate line records, as made up by the translator, are now in a form to be run through the tabulators for printing the list of toll calls for each line and the total charge for the local calls for said line. Or, again, if preferred, it may be found feasible to have the tabulator make out the complete bill.

A clearer conception of the scope and purpose of the invention may be obtained from the followinging description and attached drawings in which:

Fig. 1 shows the general layout of all the figures pertaining to the invention;

Figs. 2 to 13, inclusive, arranged as shown in Fig. 1 comprise the translator as follows:

Figs. 2 and 3 show the line-finder terminal translator;

Figs. 4 and 5 show the called office translator;

Fig. 13 shows a detailed construction of the pneumatic valve.

Figure 5:
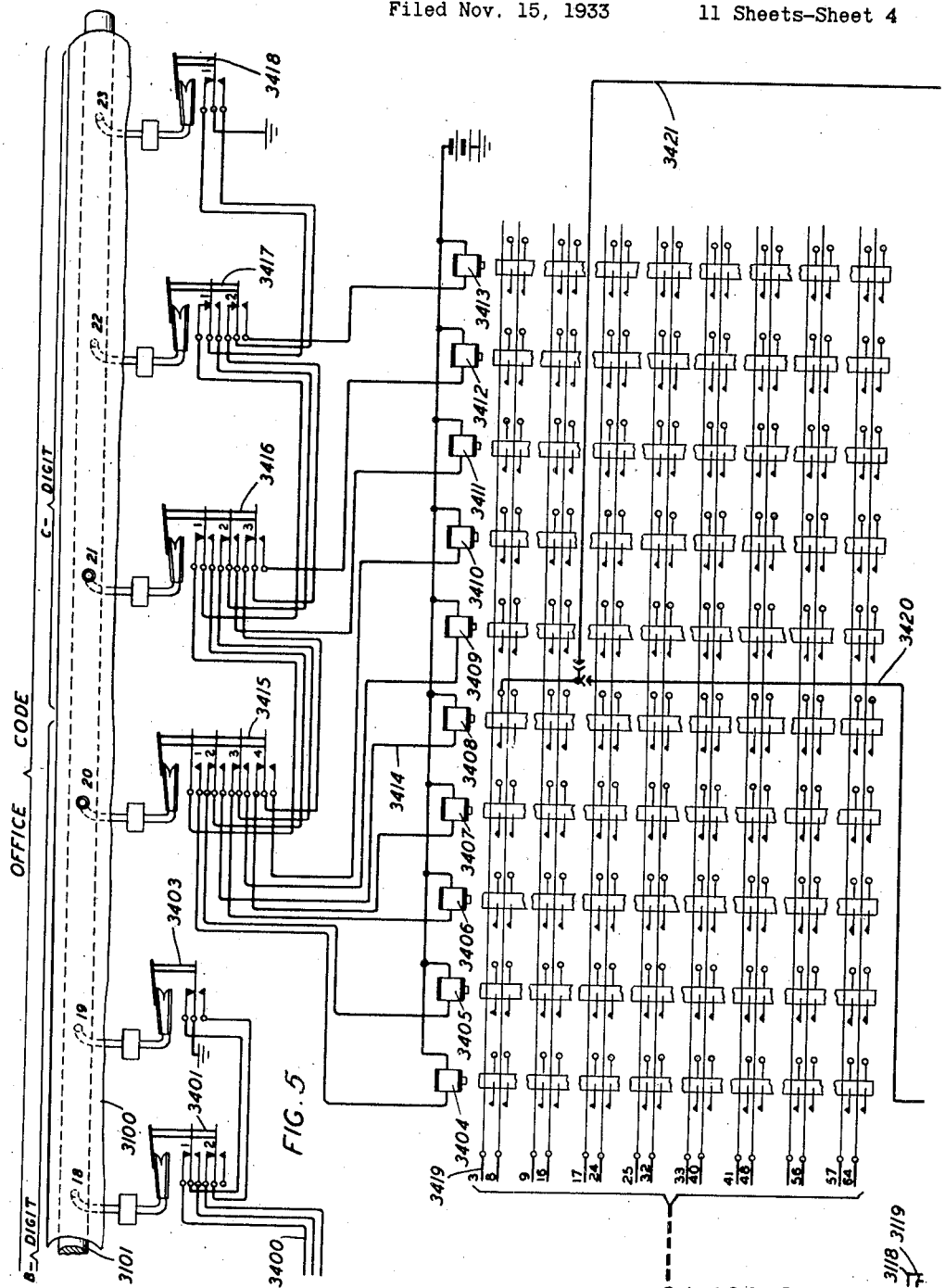
Figure 6:
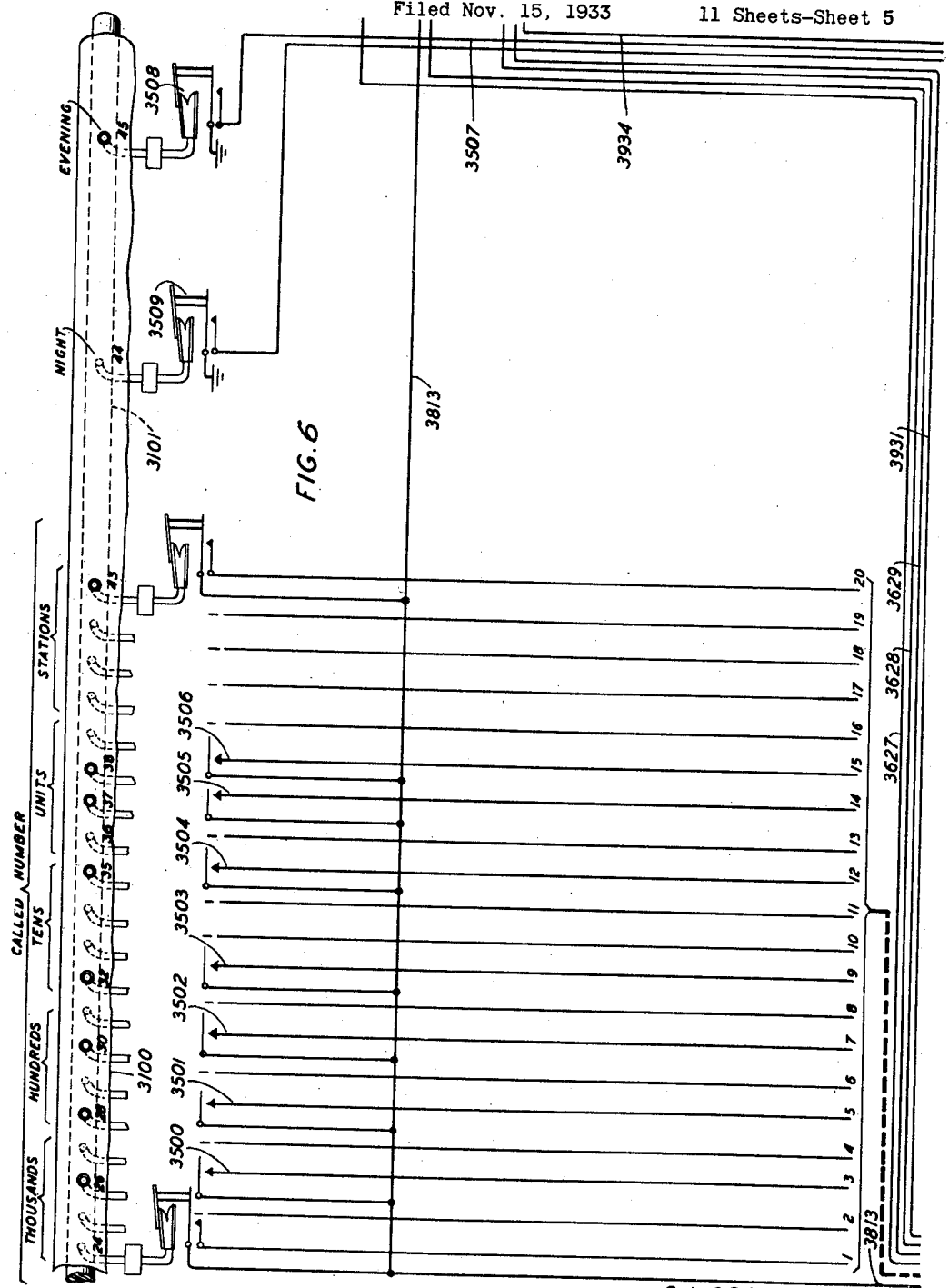
Fig. 6 shows the called number translator.
Figure 7:
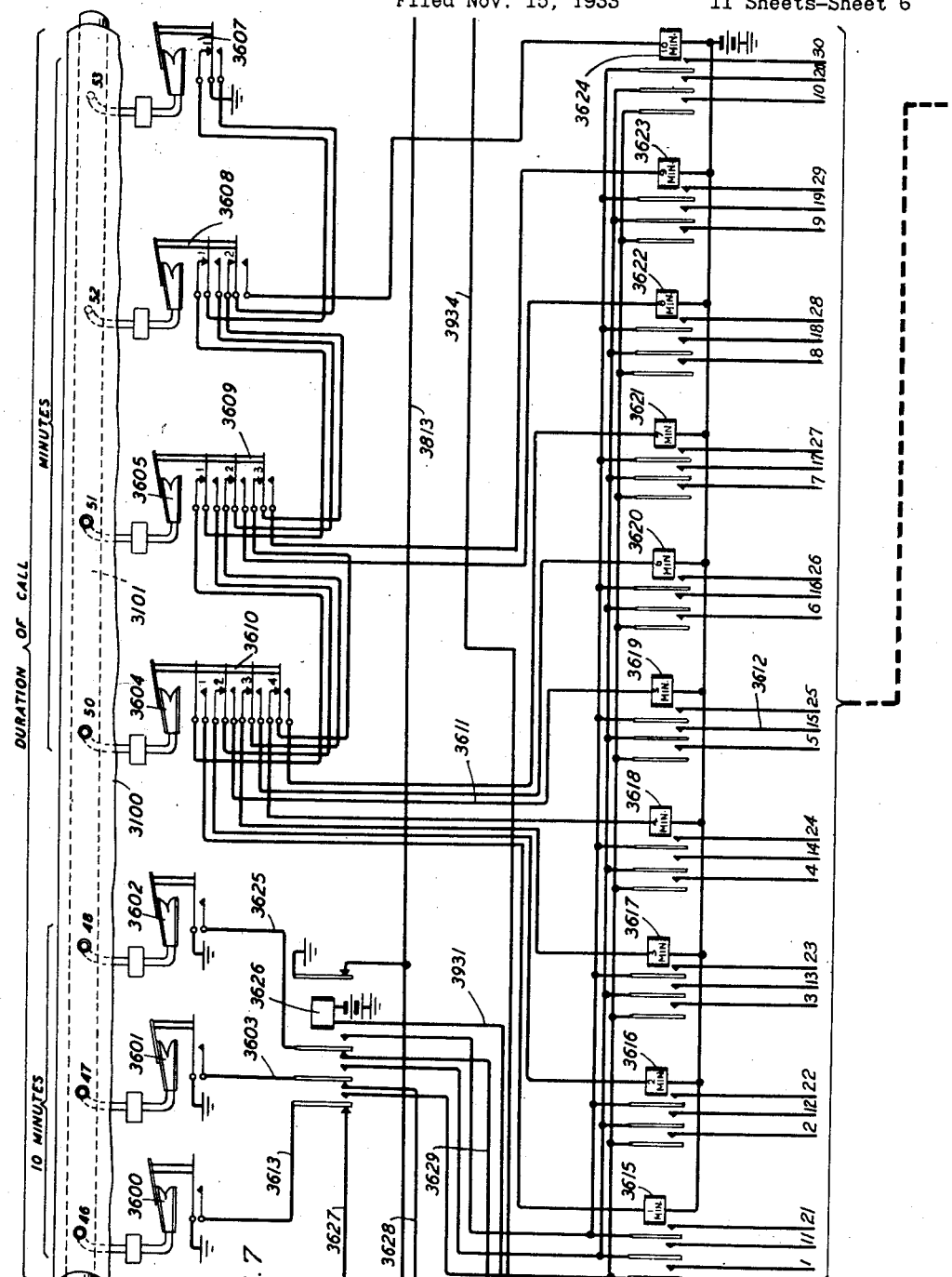
Fig. 7 shows the time translator.
Figure 8:
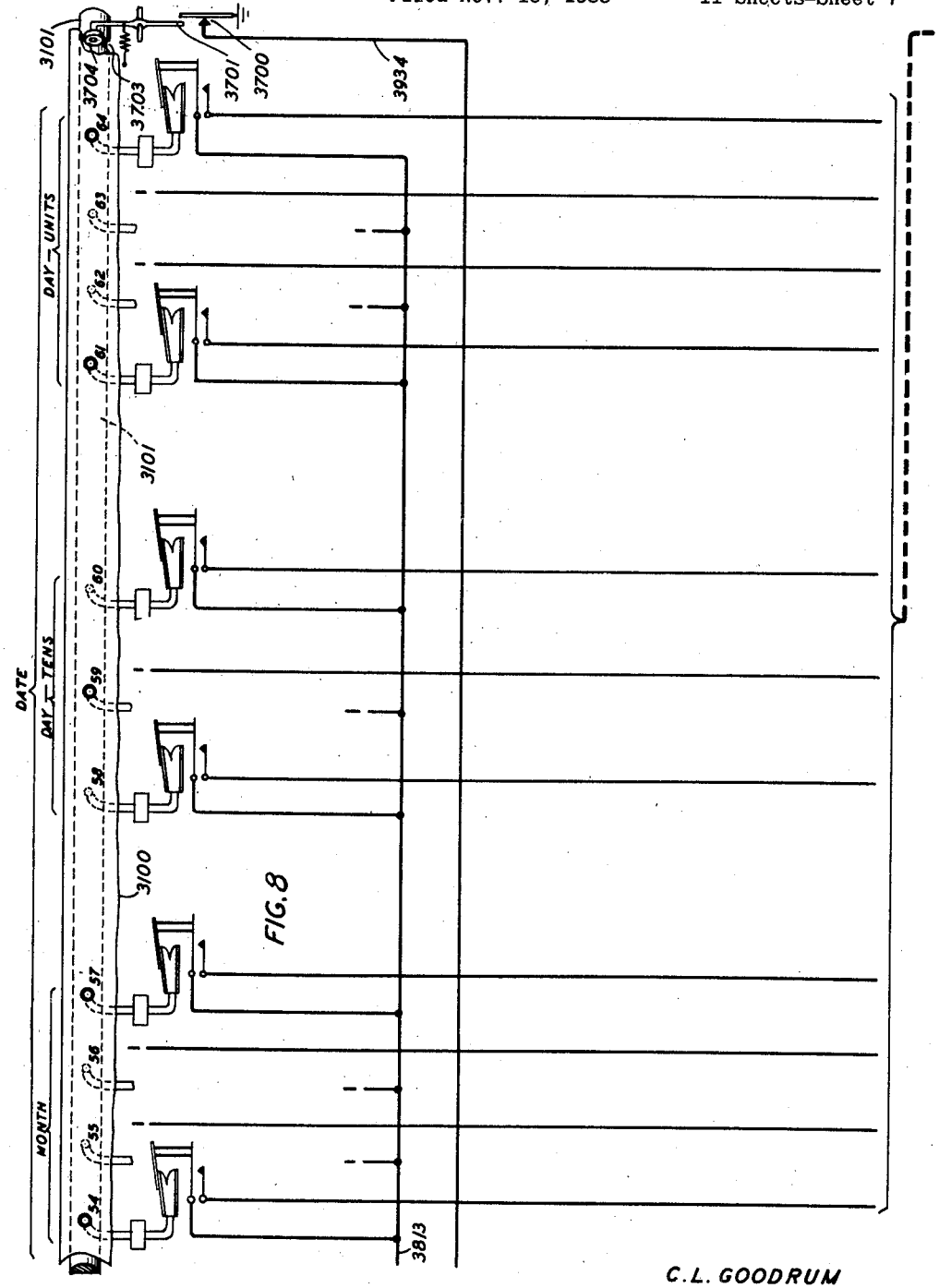
Fig. 8 shows the date translator.

Before proceeding with the detailed description of the apparatus which responds to the perforations of the call records contained in the primary tape disclosed in the above-mentioned Goodrum application, it is necessary to give a brief description of the organization of the call record on said primary tape.

As said before, this tape is in the form of a continuous roll on which the call records are punched by a series of magnets transverse the tape. There are in all sixty-four punched positions on said tape and, in accordance with the information recorded upon the tape, these positions are subdivided into a number of groups with each group recording one item of information. Thus, by referring to Figs. 2 to 8, inclusive, the top of which shows an ordinary tracker bar having a number of openings corresponding to the punched positions of the primary tape, it will be seen that the entire sixty-four punched positions are subdivided into the following groups, each of which is used to record the following information:

Positions 1–3_____Subscriber's line-finder group.
Positions 4–7_____Tens group in said line-finder group.
Positions 8–11____Unit digits in each of said tens groups.
Positions 12–15___First digit of called office code.
Positions 16–19___Second digit of called office code.
Positions 20–23___Third digit of called office code.
Positions 24–27___Thousands digit of called number.
Positions 28–31___Hundreds digit of called number.
Positions 32–35___Tens digit of called number.
Positions 36–39___Units digit of called number.
Positions 40–43___Stations digit of called number.
Position 44_____Night rate.
Position 45_____Evening rate.
Positions 46–48___Ten minute subdivision of duration of conversion.
Positions 50–53___Minute subdivision of duration of conversation.
Positions 54–57___Month.
Positions 58–60___Tens subdivision of the month.
Positions 61–64___Day.

Each of the above items is recorded in the above positions on the tape on a line transverse the length of the tape. However, in order to economize on the quantity of equipment required to record such information, it is recorded in code form. Use, therefore, is made of the three unit and four unit codes well known in the printing telegraph art, depending upon the number of different items which have to be recorded for each different subject. Thus, with reference to the line-finder terminal number which identifies the line group in which the calling line belongs, it is necessary to identify the particular group as well as the position of the calling line in the group. Inasmuch as the operation of the invention is being illustrated with respect to an automatic telephone office in which the subscribers' lines therein are divided into groups which are located on particular frames, called line-finder frames, and each of which accommodates two hundred lines, each line-finder frame is divided into five groups of forty lines each. Consequently, positions 1 to 3 on the tape will be punched in such a manner as to identify each of the five groups in accordance with a three unit code as follows:

| Group | Positions punched |
|---|---|
| 1 | 1 |
| 2 | 2 |
| 3 | 3 |
| 4 | 1 and 2 |
| 5 | 1 and 3 |

Each group of forty lines is further subdivided into four subgroups of ten lines each so that it becomes necessary to determine the subgroup of ten lines in which the calling line belongs. In this case, however, while four punch positions are provided to care for a maximum of the subgroups for those cases involving larger main groups than those here used, each punch position is used to indicate a different subgroup as follows:

| Subgroup | Position punched |
|---|---|
| 1 | 4 |
| 2 | 5 |
| 3 | 6 |
| 4 | 7 |

Besides the identification of the subgroup, it is necessary to identify the position of the calling line within such a subgroup, and inasmuch as there are ten lines in each subgroup, each of the digits representing the particular line must be punched in code form in positions 8 to 11 inclusive, so that each of the digits punched in positions 8 to 11 can be identified by the following:

| Digit | Positions punched |
|---|---|
| 1 | 8 |
| 2 | 9 |
| 3 | 10 |
| 4 | 11 |
| 5 | 8 and 9 |
| 6 | 8 and 10 |
| 7 | 8 and 11 |
| 8 | 9 and 10 |
| 9 | 9 and 11 |
| 0 | 10 and 11 |

In the same way, all of the other items of information (except evening and night rates) are recorded on the primary tape in either the three or four digit code and need not be further amplified except as such amplification may be necessary to an understanding of the invention as described hereinafter.

Having described, briefly, the formation of a permanent record of the history of all calls over a defined billing period made by a group of lines having access to one recording machine, the next step is to make use of this record for making a separate record for each line of all the calls made by each of said lines in the group. Each of the records thus made is of a character which can be used with a commercial printing tabulator as modified to suit the requirements of the present invention to print the subscriber's bill, as more completely described hereinafter.

It will further be remembered that, due to the character of the recording machine used, the primary record is contained on a roll of paper, not unlike a player piano roll, in which the transverse series of punches is a code record of one call, and that the record of all the calls consecutively contained thereon are not grouped with respect to the lines making the calls. Hence, the record of all the calls made by the group of 200 lines must be broken down into a separate record for each line and containing thereon the record of all calls made from said line while the coded information of each call so recorded must be revised, translated or suppressed in accordance with the manner in which the charge for the call is to be entered on the printed bill.

In order to sort out and decode each of the calls, therefore, it becomes necessary to have some mechanism which is responsive to the character of the record made on the primary tape. Since the record in this case is a tape having a series of holes punched therein by a perforating machine, transversely across the tape, the mechanism which is responsive to such perforations is a pneumatically controlled device, not unlike the pneumatic system of a player piano.

Although pneumatic systems in the piano art are old, it is believed that their application to automatic decoding systems of the character herein described and claimed is new. For this reason, the principle of the pneumatic system by which the perforated record is translated will be described in detail.

Fig. 13 shows the important parts of the pneumatic system responsive to one perforation and is commercially known in the piano player art as the single valve system. Since the perforated record of a call involves a number of perforations transversely made across a tape provided with sixty-four punching positions, there will be sixty-four pneumatic devices of the kind shown in Fig. 13, each responsive to a perforation in the particular punch position in the tape for which a pneumatic valve is provided.

The valve 4200 comprises a disk 4202 placed so that it rests above a leather pouch or diaphragm 4201. The disk is centered on a wooden spindle 4210. A button 4211 at the end of the spindle rests just above the pouch. The latter is bedded in the floor of a chamber 4206 which is connected by means of a suitable port 4203 with the bellows system (not shown) so that a state of reduced air pressure or partial vacuum may be maintained within it. Under the pouch is a channel 4207 which is not connected with the chamber save by a small vent 4205 and which connects with a channel 4207 connecting with the paper tracker duct 4208.

The top of the disk 4202 is exposed to the outer air, but it rests upon the roof of the chamber 4206 in such a way as to shut off any air from entering the chamber over its top. Sixty-four of these valves are arranged in any suitable manner and connected to one general port leading to the bellows with an individual bellows or pneumatic 4212 corresponding to each valve. As is shown in the figure, all the channels 4214 for all of the valves are brought together in straight line terminating in a smooth brass tracker bar 4215 which is as long as the width of the primary tape, and along which sixty-four tracker ducts like 4208 are spaced so that each punch position of the primary tape covers one opening 4208 of the channel. The perforated tape record is wound on a pay-out reel 4213 and rewound on a take-up reel 4209. Both reels are driven by a power mechanism of any suitable description whose speed can be controlled to suit the operating characteristics of the decoding equipment controlled by each of the pneumatic valves responsive to the tape perforations, as more completely described hereinafter.

As already indicated, the ends of the channels are brought together on the face of the tracker bar 4215 in the same order as the punch positions of the primary tape and the punched record travels across the bar at the speed required to operate each of the several decoding mechanisms when the perforated holes on the tape coincide with the channel openings.

Assume, now, that the perforated tape is in a position to seal up the tracker duct 4208, that is, no perforations are present. If, now, the chamber 4206 is put in a state of partial vacuum by the operation of the bellows acting through the port 4203, it follows that whatever air is in the tracker duct 4207 will leak out into the chamber 4206 through the vent 4205 until the pressure in the chamber and that in the duct are equal but both below normal. Consequently, the atmospheric pressure above the disk 4202 will press down and hold the disk firmly on the roof of the chamber, keeping the pouch 4201 down and preventing any air from reaching the chamber through its roof. Hence, there will be free passage of air from the pneumatic 4212 to the atmosphere whereby the pneumatic will remain expanded as shown.

Suppose, now, that, in the process of decoding the primary tape, the perforation in a position registers with its associated tracker duct. Immediately the atmospheric air will rush into the tracker duct through channels 4214 and 4207, killing the partial vacuum and restoring the normal pressure under the pouch. The pouch, being larger than the disk, will therefore overcome the pressure which is holding down the latter from above and will force the disk upwards until it presses against the underside of the channel 4216 which is above the roof of the chamber and leads to the pneumatic 4212. Thus, the atmospheric air will be shut off from the pneumatic while a passage is opened between the latter and the chamber. The atmospheric air trapped in the pneumatic, therefore, will at once rush out into the low-pressure chamber 4206, and the pneumatic will collapse by the action of the atmospheric pressure on its outside movable wall. The collapse of the pneumatic causes the lug 4217 carried by the movable wall to bear on the connecting rod 4218 which operates a contact assembly 4219. These contacts now operate and close electric circuits which control a part of the decoding equipment as more completely described hereinafter.

When the atmospheric air entered the chamber by way of the duct it did not, however, discharge at once through the vent 4205 into the chamber 4206 and so nullify the effect of opening the duct. The vent is too small to empty the channel of atmospheric air so long as an end of the latter is opened. The quantity of atmospheric air flowing constantly down into the channel 4214 is always greater than the capacity of the vent to reduce its pressure by absorption into the chamber. Therefore, so long as the end of the channel is open, that is to say, so long as a perforation in the paper registers with the entrance to the channel, it remains under atmospheric pressure, and the pouch and the valve remain up. The pneumatic, in consequence, remains collapsed and maintains contact assembly 4219 operated. When the perforation has travelled past the entrance of the channel and said channel is closed by the succession of the air tight surface of the paper, the atmospheric air trapped in the channel is reduced in pressure by the absorption of part of it into the chamber through the vent. Consequently, the pressure under the pouch 4201 is reduced below the pressure above the top of the disk. The disk, therefore, drops, the roof of the chamber is at once sealed again, atmospheric air flows into the pneumatic which re-inflates and raises rod 4218 which, in turn, restores the contact assembly 4219 to its original position.

Each pneumatic, therefore, controls the operation of its own contact assembly, there being, as already mentioned, sixty-four pneumatics like 4212 and sixty-four valve systems with an equal number of contact assemblies although the separate contact assemblies may differ from one another by the contact combination required to care for the proper operation of the electrically responsive apparatus controlled therethrough. The number of pneumatics, of course, may be expanded or restricted depending upon the size of the record to be decoded.

While the manner by which the chamber 4206 is maintained at workable pressures lower than atmospheric forms no part of the invention and hence is not shown, any workable and commercial device for maintaining such a pressure may be used without departing from the spirit of the invention.

Having described the pneumatic system and the necessary apparatus by which a perforated record causes its operation, we will proceed to describe how, by the use of said apparatus and the manner of its operation, the perforations on the primary tape control the making of a secondary record for each line containing, in chronological order, a record of all the calls made by said line during the billing period.

In order to obtain a clear understanding of the principle underlying this part of the invention as well as the details of its operation, Figs. 2 to 12, inclusive, should be arranged as indicated in section I of Fig. 1. With the drawings so arranged, 3100 represents the perforated record as passing across the surface of the tracker bar 3101, the entire width of the perforated record being extended across Figs. 2 to 8, inclusive for a clearer exposition of the decoding apparatus. Each one of the tracker ducts leads to a pneumatic valve and attached pneumatic of the type described. These valves are schematically represented in Figs. 2 to 8, inclusive. While there are in all sixty-four such pneumatics to correspond to the sixty-four punch positions on the primary tape only representative combinations of the entire number of pneumatics together with their contact assemblies are shown in said drawings for the sake of clarity.

Before proceeding with the detailed description of the making of secondary record for each line it is desirable, first of all, to point out the operating objects sought to be accomplished when the perforated primary tape travels across the tracker bar and the call record punches come into coincidence with the tracker openings for operating the pneumatics involved.

As already mentioned, while the calls completed during the billing period by the group of two hundred subscribers served by one perforating machine are recorded in chronological order, they are not, however, grouped together with respect to the lines from which they were made. Since the printing tabulator, as described hereinafter, prints the entire bill for one line at a time, it is necessary to sort these calls, allocate them to the lines from which they were made and make a separate record of these calls for each line, said record being subsequently used to operate the tabulator to print the subscriber record of calls, where one is necessary, and the bill therefor. In order to do this, it becomes necessary to make another record, one for each line in the group and containing thereon a record of all calls made from that line. In this manner all the calls recorded on the primary tape are transferred to two hundred secondary records individual to each of the lines in the group. For this purpose, two hundred secondary punching machines are provided, one for each line-finder terminal of the group of two hundred lines and all controlled through one common translating mechanism, herein called the translator and shown in Figs. 2 to 13 inclusive. Obviously, if a secondary punching machine appertains to a line-finder terminal number and the entire office, for billing purposes, is divided into a plurality of two hundred line groups, each group being one half of a line-finder frame and each terminal in the group having the same identifying number as corresponding terminals in all other groups, then all groups will make similar primary tape records so far as line-finder terminal number identifications are concerned. Whence it follows that one translator is sufficient with which to decode the primary tape records of all the groups in the office. Further, since corresponding terminal numbers in different line-finder groups are recorded on the primary tape by the same code method as above described, the translator makes no distinction between the line-finder terminal number codes recorded in one primary tape and those recorded in another. Hence each of the 200 secondary tape records ultimately produced by each primary tape record so analyzed relates back to the correct subscribers by identifying not only the line-finder terminal number but also the line-finder group to which the primary tape appertains. This discrimination between line-finder groups, of course, is not evident from any record in the primary tape but simply from the fact that each primary tape belongs to a different line-finder group. In this manner the translator and the two hundred secondary punching machines cooperatively associated with it can be made to serve one office of 10,000 lines.

By the application of the ame principle to an entire telephone area, one translator and its 200 secondary punching machines can be made to serve each and every office in said area. For if the subscribers in each of the offices are divided into 200 line groups and the line-finder terminal numbers in each group correspond to the line-finder terminal numbers in every similar group throughout the area, then all primary tape records, so far as line-finder identification numbers are concerned, are identical regardless of the office of origin or of the particular group therein. Each of the 200 secondary records produced by some one primary tape record then relates back to a particular line-finder terminal number, the subscriber corresponding to which is then further identified by the line group to which the primary tape belongs and to the office in which said tape was made.

There is, however, one important difference between the use of the translator for one telephone office and its use for one telephone area. In the latter case, the offices are usually divided into different calling zones for each of which a different charge rate may prevail for calls completed from any office within the zone to points outside of the zone. Since, as desribed hereinafter, the secondary record of any line does not contain, in code form as does the primary tape, the record of the telephone conversation time but only a record of the charge to be made for the call, the translator, in case it is common to the area, must contain facilities for distinguishing the primary tape records emanating from the offices in the different zones in order that, in making the secondary record for a line from a given primary record of an office, the proper charge rate applicable for the zone in which said office is located may be used in computing the charge for the call.

The translator as shown in Figs. 2 to 12, inclusive performs six separate functions. Its entire mechanism, therefore, may be functionally divided into six parts as follows:

*Part 1.*—The sensing mechanism which is responsive to the perforated records on the primary tape.

*Part 2.*—The means for selecting the secondary punching machine appertaining to the line-finder terminal number registered with the call record and thereby to distribute the call records on the primary tape common to two hundred lines over two hundred secondary tapes, one for each line-finder terminal number or subscriber appertaining thereto.

*Part 3.*—The means for translating the called office code into a called office name, if necessary and of further means responsive to the called office code record for determining the charge rate to be applied.

*Part 4.*—The means responsive to that part of a call record on the primary tape which involves certain information to be further copied as a part of the secondary record.

*Part 5.*—The apparatus for computing the charges for each tool call into money units, and for each local call into call charge units, together with the means for associating the conversation time in minutes and also the evening or night rate indication with the said apparatus for computing charges.

*Part 6.*—The means for associating the line-finder terminal number on the primary tape with the directory number of the subscriber to which said line-finder terminal number appertains and the zone of the office in which the office containing said line belongs.

To describe the operation of the translator for the most general case, let it be assumed that it is to be used for decoding primary records from a plurality of telephone offices comprising a local telephone area divided into a number of different calling zones and that each of said zones defines the charge rate for calls established from any office within the zone to all other zones of said local area. Furthermore, all of the offices in the area are to be assumed to have their subscriber lines uniformly divided into groups of two hundred, and that corresponding line-finder terminal numbers in all the groups in the area are the same and recorded on all primary tapes in the manner already described. It will also be recalled that the object of breaking down the primary record of calls made by a group in any office is to make a secondary tape record for each line in that group, and that, in order to accomplish this with one common translator for the whole area, as for one office, two hundred secondary punching machines operate in combination with the one translator. Each of these machines is of the same structure as the one used for punching the primary tape. It has a feed mechanism comprising advance magnet 3818, a cooperating ratchet mechanism 3821, a take-up reel 3819, and a tape feed roll 3820, a group of punch magnets and controlling circuits for operating the same to perforate a number of holes across the tape to indicate the required information relating to one call. Each punch magnet has a punch associated with its armature, for example, in the manner disclosed in Patent 749,033 granted January 5, 1904, to F. G. Creed. The schematic representation of such a secondary punching machine is shown in the lower portions of Figs. 9 to 12, inclusive, and will be considered in detail in connection with the operation of the translator.

Associated with each punching machine and forming a part thereof, is a multi-contact relay, such as relay 3800 which, when operated, extends a number of conductors from the translator to the punch magnets of the related punching machine. The conductors from the translator are multiplied to corresponding contacts of other multi-contact relays. That is, of the entire 200 multi-contact relays, only one is operated at one time so that any electrical condition imposed on the commoned conductors as the result of the decoding process initiated by the perforations of a call record on the primary tape will be extended only to the punch magnets of that punching machine whose associated multi-contact relay has been operated. Thus, it is only necessary to select the multi-contact relay designated by the code of the line-finder terminal number contained in the call record in the primary tape to insure the selection of the secondary punching machine which has been made to appertain to that number and hence to the subscriber represented by that number.

Now, in the example chosen to illustrate the manner in which our entire invention operates, we will assume that the calling line-finder terminal is 117 which number, according to the grouping of lines on the line finder frame as previously described, indicates that the line in question belongs to the first main group, is located in the first of the four subgroups which constitute a main group and is the seventh line in said subgroup. Now to record on the primary tape the code of such a number, holes were punched on the primary tape in punch positions 1, 4, 8 and 11. Consequently, when the primary tape advances to the position where the perforations which record the assumed call are coincidental with the corresponding holes in the tracker bar 3101, the exposure of the vent holes to the atmosphere as a result of the coincidence of the perforations with the tracker hole openings causes the associated valves to operate as described and cause the collapse of their associated pneumatics 3102, 3103, 3200 and 3201. The collapse of the pneumatics, in turn, causes the operation of their respective contact assemblies 3110, 3114, 3204 and 3202. By this operation a group of decoding circuits is operated by which the particular multi-contact relay of the secondary punching machine appertaining to the line-finder terminal number 117, recorded on the tape, is caused to be selected and operated.

The entire scheme for the selection of one of the 200 secondary punching machines or, what amounts to the same thing, the one multi-contact relay which causes connection thereto, is based on a group of relays which controls, by elimination, the selection of the one conductor connected to the winding of the particular multi-contact relay sought to be selected. The pneumatics operated in response to the code perforations of the line-finder group code close circuits to operate a group relay which, through its contacts extends a group of 40 common conductors to a particular main group of 40 other conductors correlated to the main group of 40 lines indicated by the operated pneumatics of the group code. The operation of the "tens" code group of pneumatics further causes the extension of a group of tens conductors, into which the main group of 40 conductors is divided, to the contact assemblies of the units code pneumatics while the operation of the latter pneumatics, according to the units code perforations of the line-finder terminal number, completes the circuit over one particular conductor in the selected group of ten conductors thus partially extended. This conductor is connected to the winding of the multi-contact relay appertaining to the line-finder terminal number.

The line-finder terminal number of the line of origin of the call under consideration is assumed to be 117 which means, first of all, the first group of the five main groups of 40 lines each into which the group of 200 lines is divided. Consequently, the operation of the group pneumatic 3102, in response to the hole punched in position 1 of the primary tape, causes a circuit to be closed to the first group relay 3104 extending from battery through the winding of multi-contact relay 3104, conductor 3109, make contacts of the No. 3 contact set of contact assembly 3110, normal contacts of the No. 1 contact set of contact assembly 3111, normal contacts of the No. 2 contact set of contact assembly 3112, to ground. Relay 3104 operates and closes its contacts through to the common conductors which extend to the other four group relays, namely, 3105, 3106, 3107 and 3108. Relay 3104 further closes a circuit from ground on a supplementary contact, conductor 3119, winding of relay 3822 to battery. Relay 3822 operates but performs no useful function at this time.

The operation of tens code pneumatic 3103, in response to the hole punched in position 4 to indicate the first tens group, causes a circuit to be closed from ground on contacts 3114, conductor 3115, winding of relay 3116, to battery, thereby operating this relay and further extending the first subgroup of ten conductors to the contact assemblies of the units code pneumatics, while the remaining 30 conductors remain unextended.

Finally, the operation of units code pneumatics 3200 and 3201, in response to holes punched in positions 8 and 11 corresponding to the seventh units digit, now causes a circuit to be closed from ground on the alternate contact of the contact assembly 3202, the normal contact of the No. 2 contact set of contact assembly 3206, the normal contact of the No. 3 contact set of contact assembly 3207, the alternate contact of the No. 4 contact set of the contact assembly 3204, conductor 3205, No. 7 contact set of relay 3116, conductor 3117, No. 7 contact of relay 3104, conductor 3118, winding of multi-contact relay 3800, to battery. Multi-contact relay 3800 is the multi-contact relay marked by the line-finder terminal number 117, is one of the 200 similar relays, one for each line of the unit group of 200 which associates a particular secondary punching machine with a particular line-finder terminal number of any office within the telephone area. The operation of multi-contact relay 3800 now closes 64 sets of contacts, each of which extends a common conductor from the translator to the winding of a punch magnet of the secondary punching machine. The secondary punching machine has, therefore, 64 punch magnets each of which, when operated, perforates a hole in a correspondingly numbered position. The entire record of a call as it is to be transmitted for printing to the printing tabulator, as described hereinafter, will be contained in the series of holes punched transversely across the secondary tape.

Having selected the secondary punching machine correlated to the proper line finder terminal number, we will now describe how the remaining information contained on call record perforations on the primary tape is translated, suppressed or directly reperforated on the secondary tape by the secondary punching machine.

It will be recalled that immediately next to the code registration of the line-finder terminal number there is registered on the primary tape the called office code between punch positions 12 to 23, inclusive. Now the office code translator of the translator comprises a series of pneumatics which operate in accordance with the A code perforations contained between positions 12 to 15, inclusive, the B code perforations contained between positions 16 to 19, inclusive, and the C code perforations contained between positions 20 to 23, inclusive. As is well known in automatic telephony in which a dial at the telephone instrument is used to set up connections, each of the called office code letters is the equivalent of one of ten possible digits. Consequently the code of each separate letter is obtained by punching holes in the various positions above mentioned as follows:

| Punch positions | Digit or letter designation |
| --- | --- |
| First or "A" digit 12 | 1. |
| 13 | 2 A, B, C. |
| 14 | 3 D. E. F. |
| 15 | 4 G, H, I. |
| 12–13 | 5 J, K, L. |
| 12–14 | 6 M, N, O. |
| 12–15 | 7 P, R, S. |
| 13–14 | 8 T, U, V. |
| 13–15 | 9 W, X, Y. |
| 14–15 | 0 Operator. |

The several combinations of punch positions for the second or "B" digit are the same as shown above except that the punch positions are 16 to 19 inclusive, while those of the third or C digit are likewise the same except that the punch positions are 20 to 23 inclusive. When, therefore, the particular punched holes of the entire office code uncover the corresponding tracker duct openings connecting with the pneumatics responsive to the above punch positions, their operation causes the closure of their respective contact assemblies which, in turn, cause the consequent operation of another group of translating relays as follows:

The operation of the pneumatics for the A digit in accordance with the code of that digit, grounds one of eight conductors, all of which are multipled to corresponding contacts of eight relays. The operation of each of the relays is, in turn, controlled through the contact assemblies of the B digit pneumatics. These relays, in Fig. 4 are designated 3303 to 3310, inclusive. Since the eight conductors from the A code pneumatics are multipled to each of these relays, it is evident that any one of the eight conductors may be extended through any one of the eight B digit relays which may be operated, making it thus possible to extend 64 conductors in all through all of the eight relays. The operation of one of these relays further extends the grounded conductor from the operated A code pneumatics to the multipled contacts of ten C code multi-contact relays 3404 to 3413, inclusive, each one of which, in turn, is operated by the proper combination of C code pneumatics. The conductor grounded by the A code pneumatic is then carried through the B code relay operated by the B code pneumatic, to the contacts of the particular C code relay operated by the C code pneumatics, which latter operated in response to the C digit perforation on the primary tape. The contact so grounded is the particular code point appertaining to the called office code punched on the primary tape.

As an example, let us assume that the called office code of the call used for illustration is Halifax or 425. Consequently, the punching of a hole in position 15, corresponding to the code punch position for A digit 4, causes the corresponding pneumatic 3311 to operate and close contact assembly 3301, after which a path is closed from ground on the alternate contact of contact assembly on 3301, the normal contact of the No. 2 contact set of contact assembly 3319, the normal contact of the No. 3 contact set of contact assembly 3320, the normal contact of the No. 4 contact set of contact assembly 3312 to conductor 3313, which extends in parallel to the No. 3 contact set of all of the B digit code relays 3303 to 3310, inclusive, the No. 1 and No. 8 contact sets of which only are shown for all of said relays except 3303 for which are shown the No. 3 and No. 8.

The coincidence of the hole punched in position 17 as the code perforation of the B digit 2, causes the operation of pneumatic 3315 which, in turn, operates its associated contact assembly 3316 and thereby causes a circuit to be closed; from ground, normal contact of contact assembly 3402, normal contact of the No. 1 contact set of contact assembly 3401, conductor 3400, the alternate contact of the No. 1 contact set of contact assembly 3316, conductor 3318, the normal contact of the No. 2 contact set of contact assembly 3302, conductor 3317, winding of relay 3303 to battery. The first B digit code relay 3303 operates in the above circuit and closes its eight sets of contacts, further extending thereby conductor 3313 through conductor 3314, through its 3rd contact set to conductor 3419.

The coincidence of the holes punched in positions 20 and 21 in response to the perforation of the code for the C digit 5, causes a circuit to be closed from ground, normal contact of contact assembly 3418, normal contact of the No. 1 contact set of contact assembly 3417, the alternate contact of the No. 1 contact set of contact assembly 3416, the alternate contact of the No. 2 contact set of contact assembly 3415, conductor 3414 to battery through the winding of multi-contact relay 3408. Relay 3408 operates. Ground on conductor 3419 is now further extended over the No. 3 contact set of multi-contact relay 3408, conductor 3420, winding of code relay 3801 to battery. Relay 3801 is the relay which identifies the called office code. Since, therefore, the translating facilities provide for 640 possible code translations, the present embodiment of the invention discloses the possibility of using the automatic billing system for 640 possible called offices. However, it must be understood that no such limitation is intended. The telephone art is replete with innumerable devices for translating any number of codes, all of which devices may be easily modified for incorporation into the invention. Where, for instance, the number of codes to be translated is greater than 640, such as might be the case if more than eight digits were to be used for the A code or B code or both, the four unit code provided for translating each of these digits can be easily expanded to include two more conductors in the A code group and two more relays in the B code group thereby furnishing circuit facilities for translating a maximum of a thousand codes. However, the number of codes which may be translated is not the essence of the invention; these facilities may be expanded or contracted in accordance with the traffic complexities and the number of called offices involved in any particular area for which the billing system is adapted. What is included as a part of the invention is simply a code translator responsive to the code record contained in the primary tape.

The object of translating the office code is twofold; first, the called office must furnish the basic tariff rate applicable to the call so that, in computing the total charges for the call, the correct base charge may be applied; secondly, in the case of a toll call or of any call for which the called office and number is to be itemized on the bill, the office code designation as thereon printed must appear as shown in the telephone directory.

Therefore, each code relay like 3801 must furnish controlling means for indicating the base charge and other means for indicating the office name. For both of these purposes, each office code relay, like relay 3801, contains five sets of contacts which, when the relay operates, grounds five separate conductors, three of which extend to cross-connecting frame 3802, the fourth conductor 3823 is extended to a terminal on a plurality of zone switches, 3922, 3923 and 3924 for supplying the rate indication, and the fifth conductor 3813, for supplying ground to the contact assemblies of the pneumatics which control the called number and date registration for a purpose described hereinafter.

The three conductors extending to the cross-connecting frame 3802 are further cross-connected by way of block 3812 for operating relays which, in turn, control certain punch magnets of the punching machine for perforating the code of the called office in the letter code in which said office appears in the directory. However, in order to minimize the number of punches required for this purpose, each of the letters corresponding to a letter in the office code is punched in a five-unit code such as is used, for example, in printing telegraph systems. This code can be easily illustrated by considering each of the letter relays A—Y in the first of the three groups of such relays shown in Fig. 9 and the contacts 1—5 of the multicontact relay 3800 to which the contacts of these relays are cross-connected in various combinations to give the required code for each of the letters, thus:

| Letter relay | Contacts cross-connected |
| --- | --- |
| A | 1, 2 |
| B | 1, 4, 5 |
| C | 2, 3, 4 |
| D | 1, 4 |
| E | 1 |
| F | 1, 3, 4 |
| G | 2, 4, 5 |
| H | 3, 5 |
| I | 2, 3 |
| J | 1, 2, 4 |
| K | 1, 2, 3, 4 |
| L | 2, 5 |
| M | 3, 4, 5 |
| N | 3, 4 |
| O | 4, 5 |
| P | 2, 3, 5 |
| R | 2, 4 |
| S | 1, 3 |
| T | 5 |
| U | 1, 2, 3 |
| V | 2, 3, 4, 5 |
| W | 1, 2, 5 |
| X | 1, 3, 4, 5 |
| Y | 1, 3, 5 |

Figure 9:
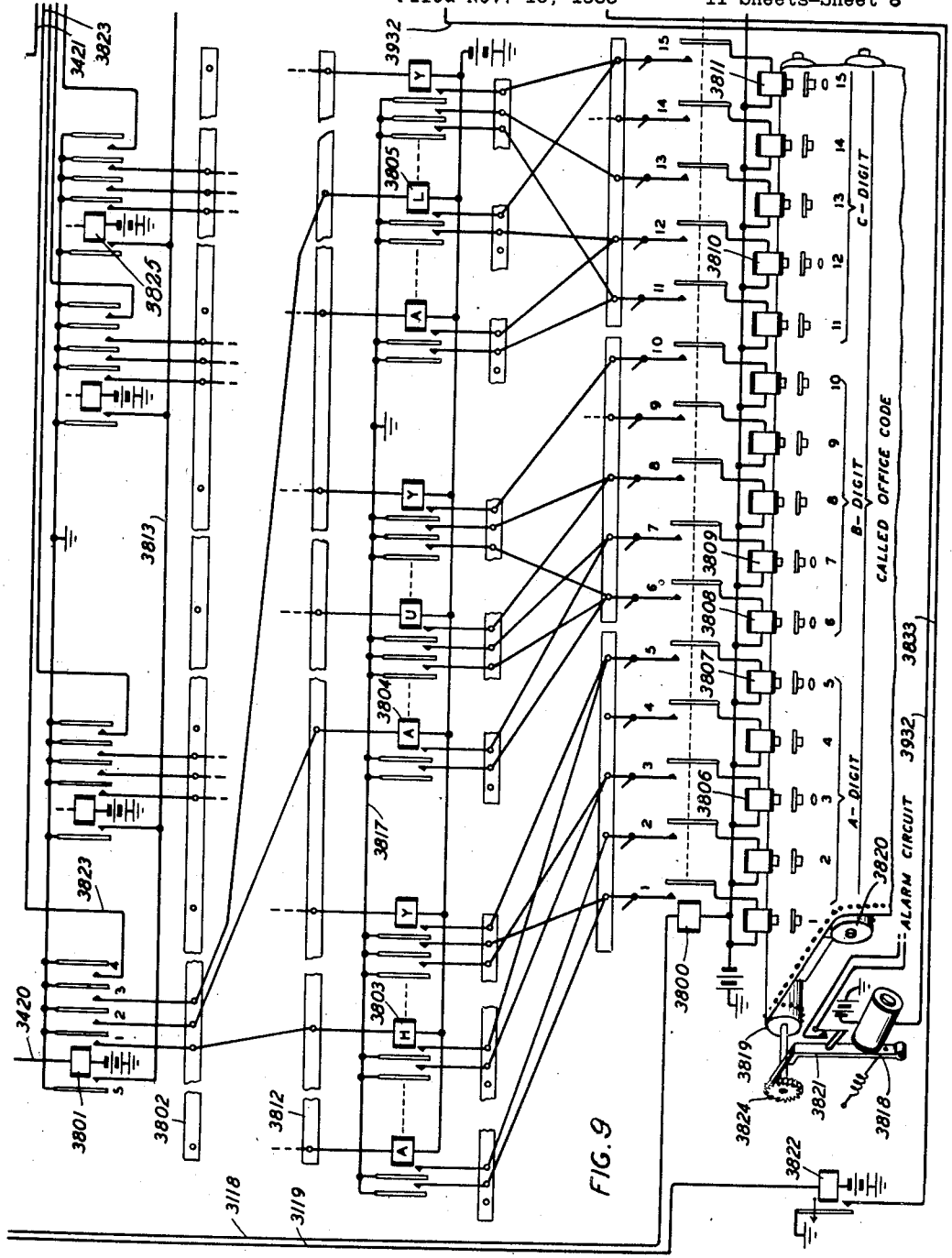
Fig. 9 shows another part of the called office translator and parts of one of the plurality of perforating machines forming a part of the analyzer.
Figure 10:
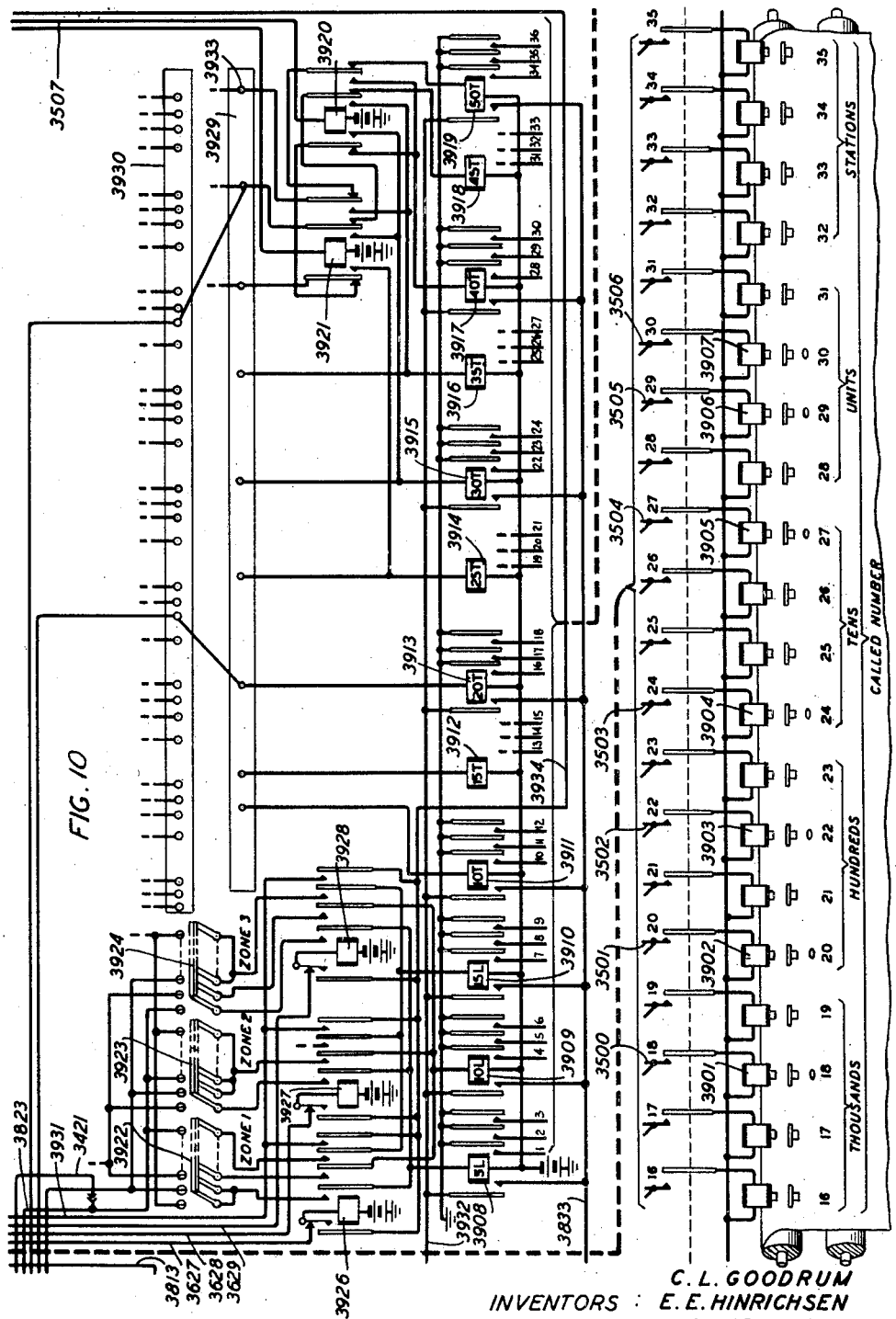
Figs. 10, 11 and 12 show the rate computer and other parts of the perforating machine partly disclosed in Fig. 9.
Figure 11:
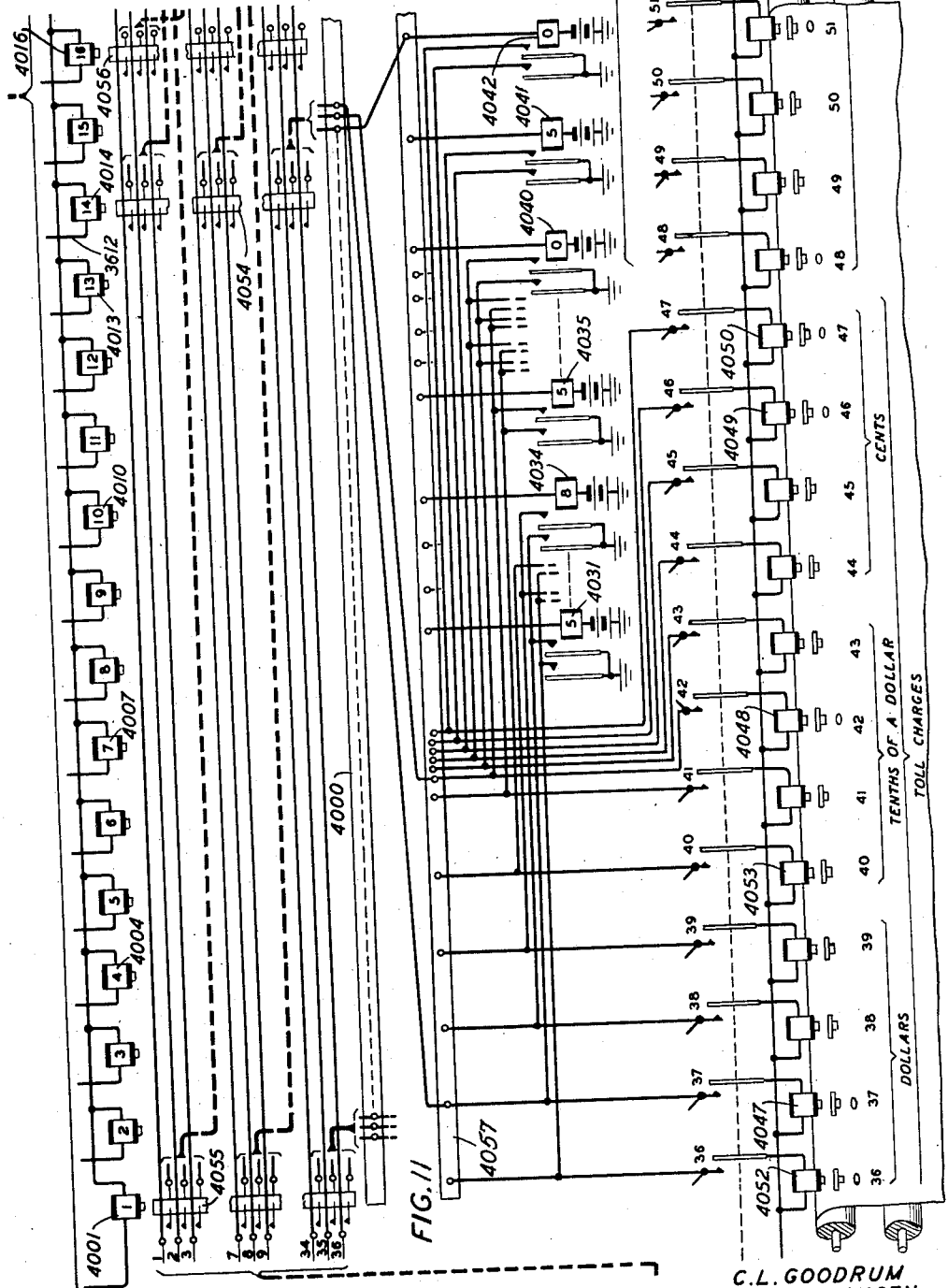
Figure 12:
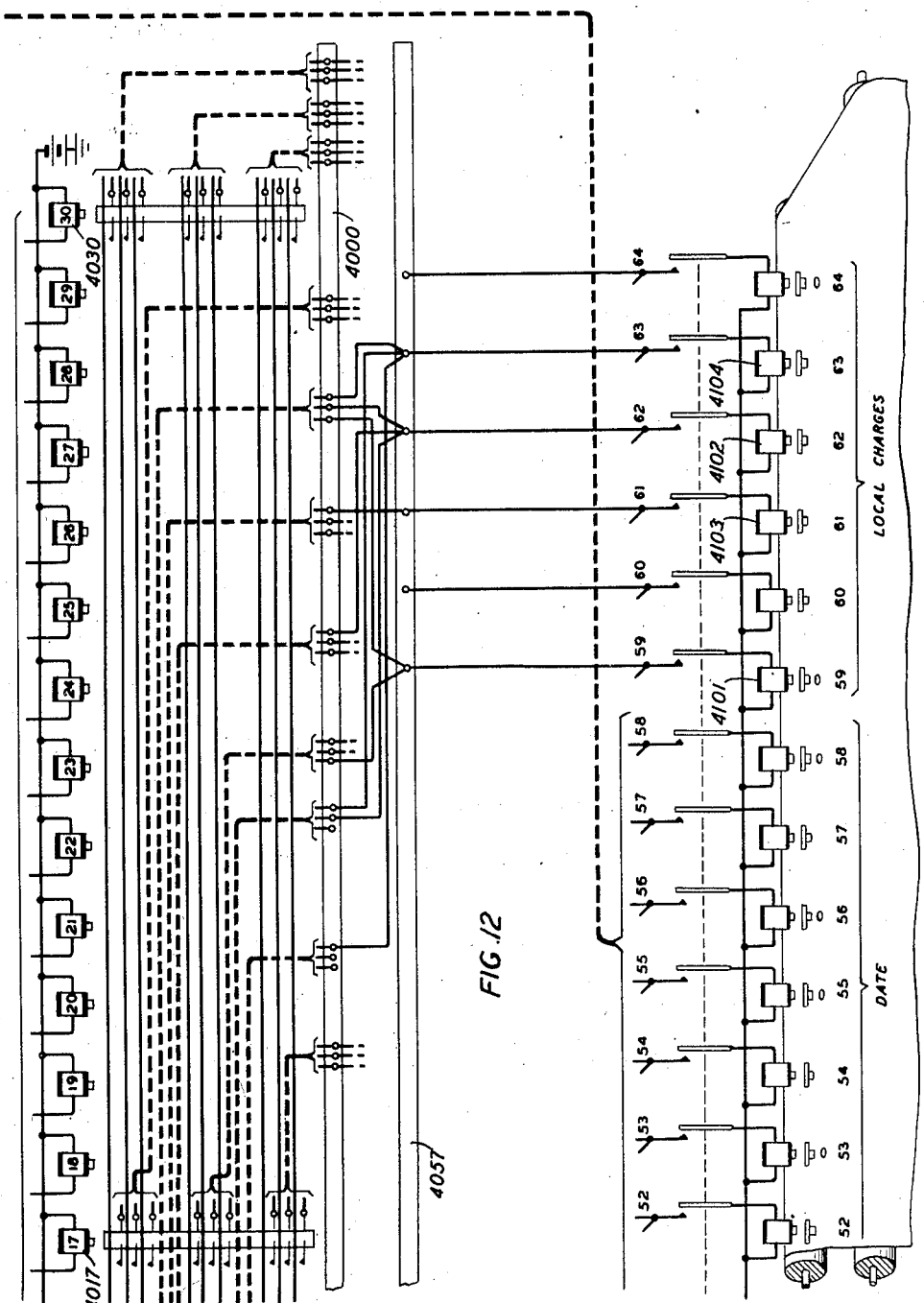

A set of relays A to Y, inclusive, therefore, is provided for each code digit and the conductors on the code relays corresponding to individual offices are cross-connected to these letter relays as required by the letters of the office code. For example, the office name of the called office corresponding to code 425 has been assumed to be Halifax, the first three letters of which are dialed by the subscriber as the code of the wanted office. Since relay 3801 is the code relay corresponding to office code 425 and, therefore, to its letter equivalent Halifax, the conductor grounded by the No. 1 contact set of relay 3801 is cross-connected from block 3802 to block 3812 and from thence to the windings of the relay corresponding to letter H of the first group of twenty-six relays provided for translating the first digit of the office code into its letter equivalent. This relay, in Fig. 9, is designated as relay 3803. The conductor grounded by the No. 2 contact of relay 3801 is cross-connected to the winding of the relay corresponding to letter A of the second group of twenty-six relays corresponding to the letter translation of the B digit. This relay, in Fig. 9, is designated as relay 3804. The conductor grounded by the No. 3 contact set of relay 3801 is cross-connected to the winding of the relay corresponding to letter L of the third group of twenty-six relays corresponding to the letter translation of the C digit. This relay, in Fig. 9, is designated as 3805. Each relay in each group of letter relays is provided with as many contact pairs as are required by the five-unit code for characterizing the letter represented by the relay. The conductors connected to the front contacts of each of the letter relays of the first group are each further extended to one contact of a contact set of a group of five contact sets on relay 3800 reserved for the letters of one digit of the code. The same is true of the front contacts appertaining to the letter relays of the remaining two groups; the extensions to the contact sets of relay 3800 in each of these two other cases taking place to other separate groups of contact sets reserved for each of the other two letters. In this manner, the magnets operating between punch positions 1 to 5, inclusive, control the registration of the A digit in accordance with the five-unit code, the magnets operating between punch positions 6 to 10, inclusive, control the registration of the B digit and the magnets which operate between punch positions 11 to 15, inclusive, control the registration of the C digit.

Returning to the illustration, the A digit code letter relays, of which only relays corresponding to the letters A, H and Y are shown, show relay 3803 of the letter H having two sets of contacts, the first of which is cross-connected to the No. 3 contact set of relay 3800 which, in turn, controls the operation of punch magnet 3806, and the second is cross-connected to the No. 5 contact set which, in turn, controls the operation of punch magnet 3807. Consequently, the operation of relay 3803, which occurs over an obvious circuit when relay 3801 operates, closes two circuits, as follows: (1) ground on conductor 3817, outer contact of relay 3803, No. 3 contact set of relay 3800, winding of punch magnet 3806, battery. The magnet operates and causes a hole to be punched in punch position 3 of the secondary tape; (2) ground on conductor 3817, inner contact of relay 3803, No. 5 contact set of relay 3800, winding of punch magnet 3807 to battery. The magnet operates and causes a hole to be punched in position 5 of the secondary tape. The holes punched in these two positions, that is, positions 3 and 5 designate the letter H, according to the above five-unit telegraph code above described.

Relay 3804 of the second group of letter relays of which only the relays corresponding to letters A, U and Y are shown, corresponds to the letter A. It has two sets of contacts and they are cross-connected to contact sets Nos. 6 and 7 of relay 3800, which control, respectively, the operation of punch magnets 3808 and 3809. The relays corresponding to letters U and Y show their contacts cross-connected to the appropriate contact sets of relay 3800 for the designation of their appertaining letters according to the above mentioned telegraph code. Hence, when relay 3804 operates, two circuits are closed as follows: (1) ground on conductor 3817, outer contact of relay 3804, No. 6 contact set of relay 3800, winding of punch magnet 3808, battery. The magnet operates and causes a hole to be punched in position No. 6 of the tape; (2) ground in conductor 3817, inner contact of relay 3804, No. 7 contact set of relay 3800, winding of punch magnet 3809 to battery. The magnet operates and causes a hole to be punched in position No. 7 of the tape which, in conjunction with the hole in position 6, designates the second letter A of the dialed office code.

Relay 3805 of the third group of letter relays of which relays corresponding to A, L and Y only are shown, corresponds to the letter L. It has two sets of contacts, the first of which is cross-connected to the No. 12 contact set of relay 3800 which, in turn, controls the operation of punch magnet 3810, and the second is cross-connected to the No. 15 contact set of said relay which, in turn, controls the operation of punch magnet 3811. Consequently, when relay 3805 operates two circuits are closed as follows: (1) ground on conductor 3817, outer contact of relay 3805, No. 12 contact set of relay 3800, winding of punch magnet 3810, to battery. Magnet 3810 operates and causes a hole to be punched in position No. 12 of the tape; (2) ground on conductor 3817, inner contact of relay 3805, No. 15 contact set of relay 3800, winding of punch magnet 3811 to battery. Magnet 3811 operates and causes a hole to be punched in position 15 of the tape which, in conjunction with the hole punched in position 12, designates the letter L of the dialed office code.

Thus relay 3001, corresponding to the called office code 425 has been translated for reperforation on the secondary tape into the appropriate letter code HAL which, it is assumed, is the letter code printed in the telephone directory. All other office code relays, of course, have their contacts extended through cross-connecting frames 3002 and 3012 to the appropriate one of each of the relays in the three groups of letter relays which correspond to the A, B, C letters of the code identified by the separate office code relays.

It should be noted that if digit figures are used instead of digit letters for the office code, then since a maximum number of ten possible characters would be required for each of the three digits, the number of translating relays in each group would be reduced from twenty-six to ten. The four-unit code heretofore used for registering, in code form, the items of information on the primary tape could then be similarly used to register, also in code form, each of the numerical characters of the office code digits. Or, again, if, as is at present the case in large metropolitan areas, the last digit of the office code is one of the ten digits in order to provide for the use of the same office name for a plurality of offices such as, for example, Halifax 2, Halifax 3, etc., then, the last group of twenty-six letter relays can be omitted and ten relays for the four-unit code can be used to record the numerical character. Where, however, the four-unit code is used, only four punch magnets per digit are required instead of five.

The information on the primary tape next to be recorded on the secondary tape is the group of codes designating the called number. The punched holes indicative of the number appear in various combinations between positions 24 to 43 inclusive. Since the number may comprise five separate digits or characters including a party station designation, each digit or character is recorded by a four-unit code involving the perforation of one or two holes in four punch positions allotted for each digit, namely, the thousands digit registration between positions 24 to 27, inclusive, the hundreds digit registration between positions 28 to 31, inclusive, the tens digit registration between positions 32 to 35, inclusive, the units digit registration between positions 36 to 39 and the stations digit registration between positions 40 to 43, inclusive.

The called number, if it is to be itemized in the bill and herefore must be recorded on the secondary tape, needs no translation from the manner in which it was recorded on the primary tape. Hence, the record as contained in said tape may be directly copied into the secondary tape. Therefore, under such circumstances, each of the pneumatics responsive to the several punch holes indicating the called number close contacts which extend ground on conductor 3013 to the separate contact pairs of the multi-contact relay 3800, the mates of which contacts, in turn, extend, respectively, to the windings of separate punch magnets so that, when relay 3800 operates and the called number pneumatics responsive to the punched holes have operated, the punch magnets which have been directly connected by the operation of relay 3800 to the grounded contacts of said pneumatics, operate in the combinations corresponding to the holes in the primary tape and punch the same record in the same codes on the secondary tape.

Since each one of the pneumatics operated by the holes of the called number code controls an associated contact assembly which has but one pair of contacts, all of these separate pneumatics are not shown, but only the first, which is responsive to punch position 24, and the last, which is responsive to punch position 43, the conductors connected to all of the other pneumatics being simply indicated as connected thereto and extending to contact sets Nos. 16 to 35, inclusive, of multi-contact relay 3800.

Let us assume that the called subscriber's number is 3678. In consequence of this, the thousands digit 3 is represented by a hole punched in position 26 of the primary tape, thereby causing the operation of the corresponding pneumatic (not shown), and the consequent grounding of conductor 3500 by way of ground on conductor 3013 connected thereto through the No. 5 contact set of office code relay 3001. Hence, a circuit is closed from ground on conductor 3500, No. 18 contact set of relay 3800, winding of punch magnet 3901 to battery. Magnet 3901 operates and causes the punching of a hole in position No. 18 of the secondary tape thereby recording, in code form, the thousands digit 3.

The registration of the hundreds digit 6 caused holes to be punched in positions 28 and 30, respectively, of the primary tape, thereby causing the consequent grounding of conductors 3501 and 3502 by way of conductor 3013. Hence circuits are closed: (1) from ground on conductor 3501, No. 20 contact set of relay 3800, winding of punch magnet 3902, battery. The magnet operates and causes a hole to be punched in position 20 of the tape; (2) ground on conductor 3502, No. 22 contact set of relay 3800, winding of punch magnet 3903 to battery. The magnet operates and causes a hole to be punched in position 22 of the tape which, in conjunction with the hole punched in position 20, records, in code form, the hundreds digit 6.

The registration of the tens digit 7 caused holes to be made in positions 32, 35, respectively, of the primary tape, thereby causing the consequent grounding of conductors 3503 and 3504 by way of conductor 3013. Hence, circuits are closed: (1) from ground on conductor 3503, No. 24 contact set of relay 3800, winding of punch magnet 3904 to battery. The magnet operates and causes a hole to be punched in position 24 of the tape; (2) ground on conductor 3504, No. 27 contact set of relay 3800, winding of punch magnet 3905 to battery. The magnet operates and causes a hole to be punched in position No. 27 of the tape which, in conjunction with the hole punched in position 24 records, in code form, the tens digit 7.

The registration of the units digit 8 caused holes to be punched in positions 37 and 38, respectively, of the primary tape thereby causing the consequent grounding of conductors 3505 and 3506 by way of conductor 3013. Hence, circuits are closed: (1) from ground on conductor 3505, No. 29 contact set of relay 3800, winding of punch magnet 3906, to battery. The magnet operates and causes a hole to be punched in punch position 29; (2) ground on conductor 3506, No. 30 contact set of relay 3800, winding of punch magnet 3907, to battery. The magnet operates and causes a hole to be punched in punch position No. 30, which in conjunction with the hole punched in position 29, records in code form, the units digit 8.

There being no station's letter for the assumed number of the called subscriber, no holes were punched in positions 40 to 43, inclusive, of the primary tape. Consequently, their corresponding pneumatics in the analyzer are not operated and the corresponding punch magnets for positions 32 to 35 of the secondary tape remain unoperated.

The secondary tape besides containing the requisite perforations to print the called office and number when required, must contain, as well, a punched code which designates (a) the charge for the call in terms of a base call charge unit if the call is completed within what has been defined as the local area, (b) the charge for the call in money units if said call has been completed to a toll point. In the case of local calls, or such calls completed to points within the local area for which different rates apply for different calling zones, it is the usual practice for the operating company to bill such charges to the subscriber only in terms of standard local charge units rather than in money units and furnish no itemized account for the call. For example, local calls may be designated as calls which may be made for five cents for a standard period of conversation, and five cents for each defined overtime period thereafter; others for ten cents or two call charge units for the initial conversation period and five cents or one local charge unit for each period of overtime thereafter, and yet others may have an initial charge rate of fifteen cents or three local charge units of five cents each for the first period of conversation and five cents or one call charge unit for each defined period of overtime thereafter. For instance, if the subscriber has conversed for fifteen minutes over a connection in which the initial charge is five cents and the overtime charge is five cents for each additional five minutes or fraction thereof, the bill to the subscriber would merely indicate three local calls at five cents each. Or again, if the call is to an office within the local area but for which the base rate charge is ten cents for the first five minutes and five cents for each three minutes of overtime or fraction thereof, this call would be billed to the subscriber as five local five cent calls without an itemized account of the fact that the call was completed to the "ten cent" area. The same thing would be true for the fifteen cent rate wherein the base rate would be charged as three local charge units and the overtime charged in terms of conversation periods adjusted to the local base rate. In other words, the operating company may deem it expedient to make no distinction between the three different types of calls and subject them all to the "bulk billing" practice so long as a detailed account of a call is confined to such as are characterized as "toll" calls; that is, calls completed to toll points.

It will be observed that, in the preferred embodiment of the invention, the primary tape is arranged to make no distinction between calls which have to be itemized or separately reported as a part of the subscriber's bill, and those which do not have to be so itemized. A toll call typically represents the former while a purely local call typically represents the latter. But the fact that the entire record of the call, whether local or toll, is contained on the primary tape does not mean that all items so recorded must necessarily be repeated on the secondary tape. In the case of local calls or calls to be charged for on a local rate basis as above described, the called office and number, although recorded on the primary tape, are not itemized on the bill. Hence, although this information, appears on the primary tape in code form, it must not appear on the secondary tape. It will be observed from Fig. 9 that the called office code relay, relay 3801, has three sets of contacts used for connection to the office code letter relays, as already described, another set of contacts for controlling the charge for the call, as described hereinafter, and yet another set of contacts which, when the relay is operated, grounds conductor 3813. In the case of calls to those offices which are to be reported on a bulk-billing basis and for which an itemized report of such calls is not to be furnished the code relay can be omitted entirely and conductor 3420 which is connected to its winding can be extended directly to the proper charge terminal on the zone switching blocks 3922, 3923 and 3924. As a matter of convenience, two conductors are shown as extending from the code contact in Fig. 5, namely, conductor 3420 when a code relay is used, and conductor 3421 when the code relay is not used. In the latter case, conductor 3421 extends directly to the zone switching blocks 3922, 3923, and 3924. Under such circumstances, the coincidence of the punched holes in the primary tape designating the called office and the consequent operation of the corresponding pneumatics, will not cause a record of such designation to be perforated on the secondary tape, for, in such a case, the entire translation of the office code, without the code relay, results in the grounding of conductor 3421. Since no code relay is thus operated, the punch magnets between punch positions 1 to 15, inclusive, of the secondary tape can not operate. No office code record, therefore is punched on the secondary tape. And, further, since there is no code relay, conductor 3813 is not grounded so that, although the primary tape perforations of the called number cause the operation of their corresponding pneumatics, nevertheless no punch magnet circuits are closed through their respective contact assemblies since these circuits are completed to ground on conductor 3813 and to which no ground is now connected. Hence, the punch magnets operating between positions 16 to 35, inclusive, do not operate and no called number is recorded.

It is entirely possible, of course, to suppress the perforation of the office code and number in the primary tape. It is thought, however, that, for record purposes, it would be desirable to make a permanent record of the call and that such a record can be appropriately made on the primary tape. If the subscriber should dispute the accuracy of his bill with regard to local calls charged for in local service units, the operating company is in a position to prove to his satisfaction that some of the calls entered in his bill as local calls, although charged for on a local rate base, nevertheless have initial and overtime charges different from the standard local unit. Hence, in the preferred embodiment of the invention, we have disclosed what appears to us to be the more desirable commercial arrangement. But either method is perfectly satisfactory and both are included as a part of the invention.

Further, in the present embodiment of the invention, and in order to show the completeness with which all items of information may be reported to the subscriber if so desired, the disclosure is arranged to record all information on the secondary tape even though the call is completed within the local area. Since the called office Halifax is assumed to be within the local area and one for which the initial call period is three times the base rate, this called office and number would ordinarily not be printed on the bill. We can, however, without injury to the description of the invention but simply to aid in its clarity assume, alternately, that the office Halifax is within the local area or outside of it and that, in this instance, it is outside, that is, in the toll area and for which the called office code and number must appear as a separate item on the bill, making it necessary to punch a record of said office and number on the secondary tape, as already described. On the other hand, if the office Halifax is within the local area as originally assumed and the charge for a call to which is to be made in multiples of the local service unit and an itemized account of said call is not to be entered in the bill, the code relay 3801 can be entirely omitted and conductor 3421 extended directly to the zone switches, as already described. Now, when the office code and called number pneumatics operate, the absence of any connection to the letter translating relays on the one hand, and the absence of ground in conductor 3813 on the other, will not cause the punch magnets from punch position 1 to 35 to operate, thereby suppressing the called office and number from the record of the call on the secondary tape.

Having recorded the called office and number on the secondary tape, it now becomes necessary to record the charge to be made for the call. This information is to be recorded in terms of local service units if the call is completed to an office within the local area and in terms of actual money charges if the call is completed in the toll area. Since the only information recorded on the primary tape which relates to the charge to be made for the call is the code of the office to which the call is completed and the duration of the conversation, the information to be recorded in the secondary tape is a translation of the time consumed for the call in terms of the local rate charge or the total money charge, in either case as determined by the prescribed rate for the office. This translation is achieved through the rate computer, shown in Figs. 10 to 12, inclusive.

The structural arrangement of the rate computer, as disclosed in the present embodiment of the invention, is based on a predetermined rate structure. It involves the combination of means responsive to the elapsed interval of conversation, divisible into a predetermined initial period and a number of predetermined overtime increments thereof, and means responsive to the rate indication as determined by the code of the called office and the zone of the calling office. This combination marks a group of contacts which are further utilized to operate a required number of magnets to punch the charge for the call in code form, in terms of multiples of local service units or in actual money charges, different groups of magnets being reserved to punch the different types of charges.

Necessarily, then, the number of groups of marking contacts to be provided in the computer depends on the number of different conversation periods which may be obtained out of each base charge for the maximum period of conversation which can be registered. For instance, if the entire local area is divided into three calling zones and the maximum conversation period which can be recorded is thirty minutes, then, on calls from offices located in the first zone the number of groups of contacts to be provided for this rate is a function of the initial period of conversation, the overtime increments thereof and the maximum period of conversation. If calls from this zone are to be charged for on the basis of a five minute initial conversation period and thereafter in overtime increments of five minutes or fraction thereof, then, for a maximum conversation period of thirty minutes, there would be a possibility of six different charges as defined by the duration of the call. A group of contacts, therefore, is provided for each different charge. Or, again, on calls from offices located in the second zone for which the base rate may be assumed to be ten cents, the number of groups of contacts to be provided for this rate is likewise a function of the initial period of conversation, the overtime increments thereof and the maximum period of conversation. If the calls from this zone to points outside of the zone but within the local area are to be charged for on the basis of ten cents for an initial period of conversation lasting five minutes and thereafter five cents for each three minute increment or fraction thereof, then, for a maximum period of conversation of thirty minutes there would be a possibility of ten different charges as defined by the duration of the call. And, in the same way, calls from zone 3 to points outside of the zone but within the local area which may be assumed to be charged for on the basis of fifteen cents for the initial five minute period of conversation and thereafter five cents for each two minute increment or fraction thereof, there would be a possibility of fourteen different charges as defined by the duration of the call.

In the same manner the maximum number of different charges for each toll rate provided may be determined. Once a group of contacts is fixed to represent a specific charge it remains fixed unless and until the rate structure is changed, at which time the maximum number of possible charges for each rate is redetermined by the newly defined initial and overtime periods assigned for the rate.

Obviously, once the charge is identified by a specific group of contacts, the registration of the charge on the secondary tape may be controlled by circuits effective through said contacts. And the character of the registration may be adapted to conform to what the operating company finds suitable to report to the subscriber to be charged. The most prevalent practice, as already indicated, is to report each charge for a toll call as a separate item in the money unit representing said charge while all local calls, that is, calls completed within the local area, are not so identified and are reported in bulk as so many local rate calls, including those for which the charge for the initial period is a multiple of the local service unit. If the registration mechanism of the computer is adapted to the practice above illustrated and if it is borne in mind that the record as contained in the secondary tape is what actuates the printing tabulator, as described hereinafter, then, each separate charge for each call emanating from zone 2 or 3 will have to lose its identity in the registration and has to be recorded simply as so many local calls of five cents each. The registration of toll calls, on the other hand, will be in terms of dollars and cents. It must be evident, then, that the registration of the charge itself on the secondary tape is entirely flexible, is a function, not only of what is to be registered but also of the characters by which the registration takes place.

The registering mechanism of the computer, as contained in the present embodiment of the invention, is based on the practice above described. It then follows that, in illustrating one form of registering mechanism, no limitation of the scope of this phase of the invention to any specific type of register is intended. Any form of registration which is responsive to a defining contact, or group of defining contacts, is within the spirit and scope of the invention and not any particular structure which, in all events, must be consistent with the cooperating parts of the mechanism used for registration and the character of the information to be registered.

The registering and computing circuit of the translator, arranged for operation in accordance with the above practice, is shown in Figs. 7, 8, 10 to 12, inclusive. It comprises a group of ten "minute" relays, 3615 to 3624, inclusive, each responsive to the minutes pneumatic code record of a particular call and indicating how many minutes of the ten minute subdivision the call has lasted. Each of these relays has three pairs of contacts, and therefore, thirty pairs of contacts in all, the corresponding contact of each pair on each relay being multipled to each other and extended, through the front contacts of switching relay 3626, to one contact of the contact assembly of one of the "tens" pneumatics The operation of one of the tens pneumatics, 3600, 3601 or 3602, in response to a ten minute subdivision of the duration of a call, and the operation of a minute relay in response to the operation of the appropriate pneumatic or pneumatics of the minute code, causes the grounding of one pair of the thirty pairs of contacts carried by all the minute relays.

From each contact pair of each minute relay is a conductor which extends to the winding of a multi-contact relay having thirty-six pairs of contacts. Since there are thirty pairs of contacts for all the minute relays, there are thirty multi-contact relays, relays 4001 to 4030, inclusive. One contact of each pair of contacts on each of said multi-contact relays is multipled to a corresponding contact on every other multi-contact relay making, thereby, one continuous conductor of all of said contacts. Since each multi-contact relay has thirty-six pairs of contacts, there are, therefore, thirty-six common conductors 1 to 36, as designated on Fig. 11, extending across all of said relays.

Now according to the present embodiment of the invention, the computer is arranged to discriminate between 12 basic rate charges, namely, three local rates, the five, ten and fifteen cent rate for local calls and of which the five cent rate is the local service unit, and nine tool basic rate charges, namely, the ten, fifteen, twenty, twenty-five, thirty, thirty-five, forty, forty-five and fifty cent base charges. Each of these rates is represented by a relay, namely, relays 3908 to 3919, inclusive. The winding of each of the toll rate relays, with the exception of relays 3917, 3918 and 3919, terminate on cross-connecting block 3929. The winding of each of the local rate relays, namely, relays 3908, 3909 and 3910 terminate on corresponding contacts on the right side of relays 3926, 3927 and 3928, respectively. Relays 3917, 3918 and 3919, representing the forty, forty-five and fifty cent base toll charges, respectively, are not connected directly to terminal block 3929. They are controlled, instead, through the contacts of two other relays, namely, relays 3921 and 3920 which are responsive, respectively, to the operation of the "night" and "evening" pneumatics 3509 and 3508. The rates represented by these three toll relays may change in the course of the day, and therefore, provision is made for adjusting the rate in accordance with established regulations for the evening and night revisions. When it is desirable to effect a similar change in the lower rates, relief relays may be introduced which will be likewise responsive to the night and evening pneumatics and the control of the lower rate relays extended through the contacts of these relief relays.

The thirty-six conductors extending across the thirty multi-contact relays are divided into groups of three conductors each, there being, therefore twelve groups. Each group is now extended to the contacts of a rate relay. Conductors 1, 2 and 3 of the first group are extended to the five cent rate relay 3908, conductors 4, 5 and 6 to the ten cent rate relay 3909 . . . etc. concluding with conductors 34, 35 and 36 which extend to the contacts of the fifty cent base rate relay 3919. Hence, the operation of any base rate relay results in the grounding of three conductors which are common to the entire group of thirty multi-contact relays.

The rate conductor from each of the local code relays, as for example, conductor 3823 in the case of code relay 3801, or conductor 3421 for the same code where no code relay is used, is extended to the terminals of the switching blocks 3922, 3923, 3924.

Referring back to the assumption that the operation of the translator is herein described for its most extended application, that is, for a whole telephone area, it is assumed that all of the offices within that area are divided into a number of calling zones with respect to each of which different rates may apply for calls completed to offices outside of the zone. Hence, the rate conductor which extends either from the contacts of the called office relay, like relay 3801, or the office code translator, like conductor 3421, must be flexibly extended to the different base rate relays in accordance with the rate applicable to each of the different zones. Now for convenience of illustration, it is assumed that the entire telephone area is divided into three calling zones with respect to all telephone offices within the area and that the entire area itself further comprises but one zone with respect to toll calls or all calls completed by any office within the area to any office outside the area as defined by the minimum base toll rate of ten cents. This division, of course, is not strictly accurate as, in practical cases, the entire calling area may include parts of the toll area as well and to this extent the number of calling zones is increased to take in parts of the toll area into account. Since, however, the principal of division is always the same, namely, the use of one base charge for a calling zone to all called offices within the area, the use of three calling zones will be sufficient to illustrate the manner in which the rate computer of the translator can be adapted to any number of zones into which the telephone area may be divided.

Now at the time a primary tape is transmitted through the translator, not only is the office to which it belongs a matter of knowledge but also the various calling zones in which the lines of that office are located. As will be described hereinafter the zone indication is recorded on a "master" tape in punch positions 46, 47 and 48, positions ordinarily reserved for the registration of the ten minute interval of conversation and is run through the translator ahead of the primary tape. Since but one of three zones is to be recorded in the example assumed, the operation of the corresponding pneumatic at that time by the master tape operates the translator to ground either conductor 3613, 3603 or 3625 depending upon the zone. If the calling office is located in zone 1, a hole will have been punched in position 46 in which event conductor 3613 is grounded and a circuit is completed through the outer back contacts of relay 3626, conductor 3627, continuity contacts of zone relay 3926, winding of relay 3926 to battery. Relay 3926 operates and locks to ground over conductor 3934 and contacts 3700 which are closed by lever 3701 when a tape record is threaded over the tracker bar 3101, thus lifting roller 3704 out of groove 3703 in the tracker bar. If, on the other hand, the calling office is in calling zone 2, a hole will have been punched in position 47 to register this fact, whereupon conductor 3603 is grounded and a circuit is completed over the middle back contacts of relay 3626, conductor 3628, continuity contacts and winding of the second zone relay 3927 to battery, operating this relay which also locks to the same off-normal ground. Again, if the calling office is in zone 3, a hole is punched in position 48, conductor 3625 is grounded and a circuit is completed for zone relay 3928 which extends from ground on conductor 3625, inner back contacts of relay 3626, conductor 3629, continuity contacts and winding of the third zone relay 3928 to battery. Relay 3928 operates and locks to off-normal ground. When any of these three relays operates, an obvious circuit is closed from ground over conductor 3934, the right outer contacts of said relay, conductor 3931, winding of relay 3626 to battery. Relay 3626 operates and transfers conductors 3613, 3603 and 3625 to the time register whose function is described hereinafter.

Hence, as the result of initial perforations on the primary tape, made as described hereinafter, a zone relay is operated in the translator, which corresponds to the calling zone perforated on the primary tape. Prior to the running of the primary tape through the translator, however, the appropriate zone switch 3922, 3923 or 3924 has to be set in conformity with the calling zone recorded on the tape. Therefore, if the correct switch has been set, the proper zone relay is operated, and a code relay such as relay 3825 is operated, a path will be prepared from battery, through the winding of relay 3908, and the right inner contact of relay 3926, if the zone 1 switch 3922 is operated, or through the winding of relay 3909 and the contacts of relay 3927 if the zone 2 switch 3923 is operated, or through the winding of relay 3910 and the contacts of relay 3928 if the zone 3 switch 3923 is operated. The path is further completed on the other side of the switch to ground on the rate conductor which is grounded either at the contacts of the code relay if one is provided, or is grounded at the translating point of the code translator in Fig. 5, if one is not provided.

Should it happen that the operated zone switch and the operated zone relay do not correspond, no path is provided for completing the circuit of any of the rate relays, in which event a rate relay can not operate. Since the path to the advance magnet 3818 is controlled through a closure of the left contacts of any of the rate relays, the tape can not be advanced to record subsequent calls. A suitable time alarm circuit is controlled through the back contacts of the advance magnet 3818 and if said magnet does not operate in the prescribed length of time it takes for the primary tape to advance from one set of perforations to another, an alarm is given which will call attention to the fact that the proper zone switch is not the one which was operated. In this way, the precaution is taken of making absolutely certain that the proper rate is applied for any given call. Thus, if the calling office is located in zone 1 and the called office Halifax is located within zone 3, and the basic rate from a call from zone 1 into zone 3 is fifteen cents for the initial charge period, conductor 3823 or conductor 3421, would be extended to each of the zone switches and zone switch 3922 which would have been operated, would cause the energization of fifteen cent relay 3910.

On the other hand if the calling office is located in zone 2 and the called office Halifax is located in zone 3, and the basic rate for a call from zone 2 into zone 3 is ten cents for the initial charge period, switch 3923 of the second zone is thrown and the rate conductor of the Halifax office is thereby extended to the winding of the ten cent rate relay 3909. Similarly, if the calling office is in zone 3, zone 3 switch 3924 will have to be operated and the rate conductor of the Halifax office extended to the five cent rate relay 3908 since the basic rate for calls within the same zone is five cents for the initial charge period.

On the other hand, if the called office is outside the local area and, of necessity, is in the toll area, then the rate conductor of that office would be extended to the winding of the appropriate toll base rate relay by appropriate cross connections between terminal blocks 3929 and 3930. Therefore, the grounding of a rate conductor and the setting of the zone switch, if the call is completed in the local area, or the grounding of the rate conductor, if the call is outside of that area, results in the operation of a rate relay which determines the rate which is to be applied in computing the total charge for the call. Since, however, one group of the twelve groups of commoned conductors extending across the thirty multi-contact relays 4001 to 4030 is connected to the contacts of each of the twelve rate relays, the operation of a rate relay results in the grounding of the group of conductors which are extended to its contacts. The operated rate relay further closes a circuit from ground on the contacts of relay 3922, conductor 3933, left contacts of the operated rate relay, conductor 3932, winding of advancing magnet 3818 to battery. The magnet operates, breaks its forward contacts to stop the alarm circuit while its pawl engages the next tooth in the ratchet wheel 3824 preparatory to advancing the tape on the release of the magnet, as described hereinafter.

The operation of the rate relay, then, grounds a particular group of three conductors. The interrelation of these conductors with the remainder of the rate computer will be described shortly, but it is sufficient at present to note that the office code relay or conductor which designates the code of the office furnishes a rate indication for that code. From this indication and the record of the total conversation time, the translating computer, as described hereinafter, computes the total charge, either in call charge units or in actual money units.

Returning, now, to the structural arrangement of the computer, the corresponding group of three contacts in each multi-contact relay which, when the relay operates, engage the three common conductors extending to the contacts of some one base rate relay, are further extended in groups of three to the cross-connecting terminal block 4000. From the block, each conductor in each group is further extended to the appropriate contact set of multi-contact relay 3800 which extends to the winding of a punch magnet in the group of magnets which registers the number of local call units in the case of local calls or to the winding of a punch magnet in the group of magnets which registers the actual money charges in the case of toll calls.

It is manifest from the arrangement of the rate computer as above described that each group of three contacts on each multi-contact relay represents a specific charge, and that the charge to be made for any call is marked by the grounding of the three common conductors extending to an operated rate relay and the operation of a particular multi-contact relay as determined by the ten minutes and the minute pneumatics. The group of three contacts on the multi-contact relay so operated which contact with the three grounded conductors extending thereto, fixes the charge for the call being recorded on the secondary tape. In the case of local calls, however, it has been assumed that the identity of the rate itself will have been discarded once the total charge has been fixed in the computer by the marking of contacts which represent the charge and that said charge will be recorded simply as so many local calls at the local service rate. Hence, all groups of contacts on the multi-contact relays appertaining to the 5, 10 and 15 cents local base rate relays, that is, the groups of contacts in all multi-contact relays cooperating with common conductors 1 to 9, inclusive, are extended to those contact sets of relay 3800 which close through to the windings of punch magnets operating in punch positions 59 to 64, inclusive, in appropriate code combinations for recording the equivalent number of charges in local service units for calls whose charges are marked by the respective group of contacts engaging the three separate groups of conductors 1—3, 4—6, 7—9. According to the time rate structure assumed, which makes the charge of the longest local call that having a base rate of fifteen cents for the first five minutes, five cents thereafter for each two minutes increment or fraction thereof, this call is to be registered as the equivalent of 16 local calls at local service rate of five cents per call. Hence, magnets operating between positions 59 to 64 are divided into two groups, namely, a group of two magnets operating in positions 59 and 60 to register whether the number of local charges to be assessed is less than ten or more than ten, and another of four magnets operating between positions 61 to 64, inclusive, to register, in terms of a four unit code, the units digit of the total number of local service charges to be assessed. Each contact of the contact pairs on relay 3800 which extends to the winding of one of the magnets of the first group is cross-connected to the first conductor of the group of three which marks a local call charge, namely, to contact set 59 if the total charge is less than ten local service units and to contact set 60 if the total charge is more than ten local service units. To one or two contact pairs on relay 3800 of the four contact pairs extending to the winding of punch magnets operating between punch positions 61 to 64, inclusive, of the second group, are cross-connected one or two of the remaining conductors of the group of three which marks a local call charge. They are cross-connected as called for by the four unit code to represent one of the ten digits depending on the units number of the local charge.

In the case of toll calls, each group of three contacts which marks the charge can not be extended directly to the punch magnets to record the charge in equivalent number of base charges but must be cross-connected, instead, to record the actual money charge. This registration may involve punching the record of three numbers if the total charge for any one toll call is limited to $8.00, requiring a code record for each digit thereof. For this purpose three groups of relief relays, 4031 to 4034, inclusive, and 4035 to 4040, inclusive, and relays 4041 and 4042 are interposed between terminal block 4057 and the punch magnets to supply the additional conductors required by the four unit code for punching the code of the numerals 5 to 8, in the case of the dollars designation and 5 to 0 for the tens digit of the fraction of a dollar and 5 and 0 for the units of a dollar.

The toll charge punch magnets comprise a group of four magnets operating between punch positions 36 to 39, inclusive, to record in the four unit code, the number of dollars to be charged for the toll call, a group of four magnets operating between punch positions 40 to 43, inclusive, to record in the four unit code the tens digit of the fraction of a dollar, and another group of four magnets operating between punch positions 44 to 47, inclusive, to record in the same code either the 5 or 0 units digit of the fraction of a dollar since a telephone call is not charged ordinarily on any other base than five cent increments.

One contact of a set of three contacts closed by a multi-contact relay, for example relay 4014, is connected over terminals of blocks 4000 and 4057 directly through contacts of relay 3800 to one of four punch magnets for punching a hole in one of punch positions 36 to 39 if the dollar charge is less than five dollars or is connected to the proper one of relief relays 4031 to 4034 inclusive which in turn closes circuits over contacts of relay 3800 to combinations of the same four punch magnets if the dollar charge is five dollars or more. A second contact of the set of three contacts is connected over terminals of blocks 4000 and 4057 directly through contacts of relay 3800 to one of four punch magnets for punching a hole in one of punch positions 40 to 43 if the fraction of a dollar charge is less than fifty cents or is connected to the proper one of relief relays 4035 to 4040 inclusive which in turn closes circuits over contacts of relay 3800 to combinations of the same four punch magnets if the fraction of a dollar charge is fifty cents or more. The third contact of the set of three contacts is connected to either relay 4041 which on operating grounds conductors extending over contacts 44 and 45 of relay 3800 to operate punch magnets controlled thereover to register a five for the cents digit of the charge or to relay 4042 which on operating grounds conductors extending over contacts 46 and 47 of relay 3800 to operate punch magnets controlled thereover to register a zero for the cents digit of the charge.

The structure of the rate computer, as a unit, will be more apparent by describing a few specific instances of its operation. But before proceeding with the description of this operation, it is necessary to understand that punch positions 46 to 53 inclusive, record a thirty-minute conversation in minute and ten-minute intervals according to the following code:

| Punch positions | Time |
| --- | --- |
| 46 | 10 minutes or less. |
| 47 | 20 minutes or less but more than 10 minutes. |
| 48 | 30 minutes or less but more than 20 minutes. |
| 50 | 1 minute. |
| 51 | 2 minutes. |
| 52 | 3 minutes. |
| 53 | 4 minutes. |
| 50–51 | 5 minutes. |
| 50–52 | 6 minutes. |
| 50–53 | 7 minutes. |
| 51–52 | 8 minutes. |
| 51–53 | 9 minutes. |
| 52–53 | 10 minutes. |

The call which has been hitherto described; viz., Halifax 3678, can be assumed to have been made from a calling line in zone 1 and to have lasted 15 minutes. It can also be assumed that the Halifax office is in the third calling zone. Hence, prior to the passage of the secondary tape through the translator, zone switch 3922 is closed, and relay 3926 operates as previously described. A circuit is now closed from ground on conductor 3823 or conductor 3421, zone switch 3922, next to outer right contacts of relay 3926, winding of relay 3910, to battery. Relay 3910 in operating, grounds conductors 7, 8 and 9. Since, further, the conversation has lasted fifteen minutes, a hole was punched in position 47 of the primary tape causing thereby the consequent operation of pneumatic 3601 and the grounding of conductor 3603 to indicate that the conversation has lasted more than ten minutes but less than twenty. The conversation, moreover, has lasted for five minutes beyond the ten minute period marked by position 47. Therefore, holes were punched in positions 50 and 51 in response to the setting of the minute switch of the district selector, causing thereby the operation of pneumatics 3604 and 3605. A circuit is now closed from ground on the normal contact of the contact assembly 3607, normal contact of the No. 1 contact set of contact assembly 3608, alternate contact of the No. 1 contact set of operated contact assembly 3609, alternate contact of the No. 2 contact set of operated contact assembly 3610, conductor 3611, winding of five-minute relay 3619 to battery. Relay 3619 operates. Since, however, conductor 3603 is grounded and relay 3926 is operated as already described, a circuit is now completed from ground on said conductor, middle front contacts of relay 3926, middle contacts of relay 3619, conductor 3612, winding of multi-contact relay 4014 to battery. It is seen, therefore, that for a conversation lasting fifteen minutes, two relays were operated by the pneumatics, namely, the five-minute relay 3619, and the multi-contact relay 4014. Further, since the call is a local one having a fifteen cent base rate, relay 3910 was operated by the office code relay. Hence, conductors 7, 8 and 9 are grounded by said relay which, in turn, extend to the corresponding make contacts of contact set 4054 of the multi-contact relay 4014. These contacts, as already indicated, are extended to terminal block 4000 and from thence are cross-connected to the combination of punch magnets which perforate, in code form, the number of local unit charges which is to be made for a call that has lasted fifteen minutes to an office whose code relay 3801 or charge conductor 3421 caused the operation of the base rate relay 3910.

Since, in the computer, no discrimination is made between a local rate five cent call and a local rate fifteen cent call except that the latter appears on the bill as the equivalent of three five cent calls and since, further, each additional two minutes of conversation or fraction thereof is simply added as another five cent call, it is therefore apparent that the fifteen minute call under consideration would be the equivalent of eight local calls of five cents each. Consequently, with contact set 4054 of multi-contact relay 4014 operated, charge conductor 7 is not extended and charge conductors 8 and 9 are extended over the middle and lower contacts of contact set 4054, cross-connection blocks 4000 and 4057, contact sets 62 and 63 of relay 3800 for operating punch magnets 4102 and 4104 to punch holes in positions 62 and 63 for designating in code form eight local charge units.

As a further illustration let it be assumed that the call to the Halifax office lasted five minutes or less in which case pneumatic 3600 operates instead of pneumatic 3601. Conductor 3613 will therefore be grounded and one or more of the minutes pneumatics 3607 to 3610 inclusive will operate in accordance with the number of minutes the conversation has lasted. As a result, one of the minutes relays 3615 to 3619 inclusive operates. Hence, the grounding of conductor 3613 and the operation of one of the minutes relays results in the operation of either the first multi-contact relay 4001, or the fourth relay 4004, or the seventh relay 4007, or the tenth relay 4010 or the thirteenth relay 4013, depending upon which of the minutes relays 3615 to 3619 inclusive has been operated. The contact sets of any of these multi-contact relays which make contact with conductors 7, 8 and 9, grounded by the operation of charge relay 3910, will extend these grounded conductors to corresponding sets of terminals on terminal block 4000 which, however, will be cross-connected together on the terminal block and connected to a single set of terminals on block 4057. One of these terminals on block 4057 will then be extended over contact set 63 of relay 3800 to punch magnet 4104 for punching a hole in position 63 of the secondary tape to indicate three charge units for the call since the call has not lasted beyond the initial five-minute period.

As a further illustration, it will be assumed that a call has been made from an office in zone 1 to another office in the same zone for which the base rate is five cents for the first five minutes of conversation and that the call lasted but one minute. Zone switch 3922 and relay 3926 would be operated in this case and charge relay 3908 would also be operated in order to ground charge conductors 1, 2, and 3. Minute relay 3615 will be operated and pneumatic 3600 will ground conductor 3613 resulting in the operation of multi-contact relay 4001. Relay 4001 now extends grounded conductors 1, 2 and 3 over its contact set 4055 to terminal block 4000. Since the charge to be made for the call is five cents or only one local charge unit, the conductor extending from the contact of contact set 4055 making with grounded conductor 3 is cross-connected from block 4000 to the terminal block 4057 which further connects with contact set 61 of multi-contact relay 3800. When, therefore, relay 3800 is operated, the computer setting as above described will complete a circuit to punch magnet 4103 which, on operating, causes a hole to be punched in punch position 61 to designate, in code form, that one local charge of five cents is to be registered for the call.

If the conversation on a five cent call has lasted six minutes, then the minimum charge against the subscriber would be two local charge units. Minute relay 3620 will have been operated by the appropriate minutes pneumatics and, due to the operation of pneumatic 3600, indicating a conversation period of less than ten minutes, an obvious circuit will have been closed to the sixteenth multi-contact relay, that is, relay 4016. In this case, however, although the base charge is still five cents, yet the total charge will be equal to two local charges or ten cents and this fact, in the rate computer, is determined by cross-connecting the conductors extending from the three contacts of contact set 4056 on relay 4016 engaging with conductors 1, 2 and 3, to the punch magnets operating between punch positions 61 to 66, inclusive, in accordance with the code to be punched to represent two local charges. Since the units registration of the number of local charges is accomplished by the perforation of holes between punch positions 61 to 64, inclusive in accordance with the code and since, further, the numeral 2 would be represented by a hole punched in position 62, only the conductor that extends from the contact of contact set 4056 which engages grounded conductor 3 is further extended from block 4000 to contact set 62 of relay 3800. On the operation of relay 3800, the punch magnet 4102 operates and punches a hole in position 62, to register, in code form, two local charge units for the call.

In the case of toll calls involving the operation of any basic rate charge relay 3911 to 3919, inclusive, the charge punchings on the secondary tape do not represent local charge units but the actual charge in dollars and cents. The reason for this is the fact that toll calls are not subject to bulk billing and are usually listed separately as a part of the monthly bill. The most usual practice is to list all the toll calls on a separate slip, together with their listing and total charges and transmit it to the subscriber along with the regular bill containing the bulk summation of all calls within the local area.

For example, if the call Halifax 3678 were assumed to be a toll call instead of a local one, and its base rate were fifty cents for the first three minutes and fifteen cents thereafter for each one minute or fraction thereof, then, if the call lasts for fifteen minutes, the total charge would be $2.30.

In this case, the rate conductor 3823, instead of having been extended to the zone switches, would have been extended to terminal block 3930, from which it would then be cross-connected to that terminal on block 3929 which is further connected to the winding of the fifty cent base rate relay 3919. This terminal, for convenience, has been marked 3933 and extends to the winding of relay 3919 by way of the outer right back contact of relay 3921, and the outer right back contact of relay 3920. Consequently, when conductor 3823 is grounded by the operation of the office code relay 3801, relay 3919 operates in the path above described, thereby grounding common conductors 34, 35 and 36. Further, since one of the zone relays 3926, 3927, and 3928 will have been operated because the entire local telephone area has been assumed to be divided into three local zones, relay 3626 operates in the manner already described and transfers conductors 3613, 3603 and 3625 to the armature contacts of the minute relays. Through the left contacts of relay 3919 a circuit is completed from ground on the left contact of relay 3822, conductor 3833, left contacts of relay 3919, conductor 3932, winding of advance magnet 3818 to battery. Magnet 3818 operates, its pawl engages the next tooth on ratchet 3824 preparatory to advancing the take-up spool 3819 and, at the same time, breaks the armature contacts to stop the alarm circuit. The toll call conversation has been assumed to have lasted fifteen minutes. Hence, relays 3619 and 4014 are operated in the manner previously described and the three contacts of relay 4014 which have engaged the grounded conductors 34, 35 and 36 extend these conductors to a set of terminals on block 4000, which are cross-connected to terminals on block 4057. Since the three contacts on relay 4014 which engage conductors 34, 35 and 36 mark a total charge of $2.30, conductor 34 is extended to contact set 37 of relay 3800, conductor 35 is extended to contact set 42 of relay 3800, while conductor 36 is extended to relief relay 4042 which, on operating, grounds contact sets 46 and 47 of relay 3800. When relay 3800 operates punch magnet 4047 punches a hole in position 37 to record the digit 2, punch magnet 4048 punches a hole in position 42 to record the digit 3 while punch magnets 4049 and 4050 punch holes in positions 46 and 47 respectively, to record the digit 0. The charge $2.30 is thus recorded on the secondary tape as a part of the call record.

If, in connection with this call, the "evening" rate is assumed to apply, then a hole is punched in position 45 of the primary tape, in consequence of which, pneumatic 3508 operates and closes the circuit of relay 3920 by grounding conductor 3507. The operation of relay 3920 opens the path to the winding of relay 3919 and closes one to the winding of the forty cent base rate relay 3917 which can be assumed to be the evening rate where the day rate is fifty cents. It will further be assumed that with a base rate of forty cents, ten cents instead of fifteen cents will be charged for each minute of overtime conversation. Consequently, the ground on conductor 3823 is effective in this case to operate relay 3917 over a circuit extending through the outer right back contact of relay 3921, outer right front contact of relay 3920, winding of relay 3917 to battery. Relay 3917 operates and grounds conductors 28, 29 and 30 which, as already described, extend to correspondingly numbered contacts on all multi-contact relays that, in turn, terminate in groups of three on block 4000. The operation of multi-contact relay 4014 extends ground over the contacts (not shown) engaging conductors 28, 29 and 30 to a set of terminals (not shown) on block 4000. One of these terminals is further cross-connected to contact set 36 of relay 3800, another to the winding of relief relay 4032 (not shown) in the group 4031 to 4034 and which, when operated, grounds conductors connecting with contact sets 40 and 42 of relay 3800, while the third is cross-connected to relay 4042 which, when operated, grounds conductors connecting with contact sets 46 and 47 of relay 3800. This particular cross-connection, representing the charge of $1.60, causes the operation of punch magnets 4052, 4053, 4048, 4049 and 4050 causing holes to be punched in positions 36, 40, 42, 46 and 47 to record in code form $1.60.

If the call is made at a time when the "night" rate applies, then the rate code would have caused a hole to have been punched in position 44 of the primary tape, which would cause the operation of pneumatic 3509 and the subsequent operation of relay 3921 over an obvious circuit. It will be assumed that the night rate is thirty-five cents and that ten cents is charged for each minute of overtime conversation. In this case, the rate conductor 3823 which has been assumed connected to terminal 3933 would be transferred to the thirty-five cent rate relay 3916 over the outer right front contact of relay 3921. This rate relay would ground common conductors 25, 26 and 27 in the same manner as relay 3917 grounds conductors 28, 29 and 30, the extension of which through a contact set (not shown) of relay 4014 to terminal block 4000 and the further extension thereof to contact sets 36, 40, 41, 48 and 49 of relay 3800 causes the operation of punch magnets to punch holes in the corresponding punch positions for the registration of the charge $1.55 which is the charge marked by the group of contacts on relay 4014 engaging common conductors 25, 26 and 27.

The remaining information which has to be recorded on secondary tape is the date which, it will be remembered, is punched in eleven positions of the primary tape, beginning with punch position 54 and ending with punch position 64. The pneumatics controlled through these positions, like those which are controlled through positions 24 to 43 and involving the called number, control the grounding of conductors extending directly to the contact sets of multi-contact relay 3800 through which the grounds are then further extended to the windings of the several punch magnets which, on operating in the appropriate combination, cause corresponding holes to be punched in the secondary tape to record the month and day on which the call was made in the same code as was used to punch the information on the primary tape. The date code is divided into three parts, namely, one which is used to record the month and two others to record the day of the month. Since provision is required for twelve separate code designations, one for each month of the year, each of these designations is obtained by holes punched in positions 54–57 in the following combinations:

| Punch positions | Month |
| --- | --- |
| 54 | January. |
| 55 | February. |
| 56 | March. |
| 57 | April. |
| 54–55 | May. |
| 54–56 | June. |
| 54–57 | July. |
| 55–56 | August. |
| 55–57 | September. |
| 56–57 | October. |
| 54–55–56 | November. |
| 54–56–57 | December. |

The designation of the day of the month is divided into two parts, namely, a tens and a units part. Since there are three ten-day groups to the month, each of the three groups may be characterized by a separate punch position as follows:

| Punch positions | Tens digit of the month |
| --- | --- |
| 58 | 1–10 |
| 59 | 11–20 |
| 60 | 21–31 |

The units digit comprises eleven possible characters, one for each of the eleven digits as follows:

| Punch positions | Units digit |
| --- | --- |
| 61 | 1 |
| 62 | 2 |
| 63 | 3 |
| 64 | 4 |
| 61–62 | 5 |
| 61–63 | 6 |
| 61–64 | 7 |
| 62–63 | 8 |
| 62–64 | 9 |
| 63–64 | 10 |
| 61–62–63 | 11 |

The punch positions 48 to 58 on the secondary tape correspond to positions 54 to 64 on the primary tape. Consequently, the registration of the date July 17 of assumed call, which was recorded by holes punched in positions 54, 57, 59, 61 and 64 will now be recorded by holes punched in positions 48, 51, 53, 55 and 58 of the secondary tape.

It is thus clear that the secondary tape comprises a transverse series of perforations arranged in definite groups and in appropriate codes to indicate the following information for a toll call: the called office, the called number, the total money charge, the date. For a local call, if the alternative wiring such as conductor 3421 is used, the only information is a record of the number of local charge units to be charged for the call since with no route relay such as 3801 operated, the office code is not translated and recorded on the secondary tape and no ground is connected to conductor 3813 for circuits controlled by the called number and date pneumatics.

As the primary tape advances over the tracker bar 3101 and the perforations of the terminal group record are succeeded by an interval of unpunched tape, the pneumatics are re-inflated, and, with the re-inflation of pneumatic 3102, relay 3104 releases, and the circuit of slow-release relay 3822 is opened. Since this relay is made slow to release, it will release after an interval whereupon the circuit of tape-advancing magnet 3818 is opened and magnet 3818, on its back stroke, advances the secondary tape one step to provide thereby a fresh supply of unpunched tape for recording the next call from the same subscriber's line. Relay 3822 is made sufficiently slow to release to allow sufficient time for the release of all punch magnets and their associated circuits as a result of the re-inflation of all pneumatics. The operated zone relay 3926, 3927 or 3928 and relay 3626 are held operated by off-normal switch 3700 until the primary tape has passed through the translator.

Separate entries for each call involving the same subscriber's line terminal are entered on successive lines so that the secondary tape contains a plurality of horizontal series of perforations, each series representing the data of one connection.

And in the same manner, as the primary tape advances across the tracker bar and the calls appertaining to different subscribers are presented for translation, the line-finder terminal perforations recorded with each call will cause the translator to select, in succession, each of the several punch machines assigned to the separate terminal numbers for recording on their cooperating secondary tapes, the data of the call recorded with the line-finder terminal number perforations.

From what has been described thus far, the secondary tape made for each subscriber's line contains a perforated record of each call made from said line over a defined billing period, as each of said calls is to be entered in the subscriber's monthly bill. This record contains: (1) a perforated record of each local call in terms of the total local charge units to be assessed for the call; (2) a perforated record of each toll call in terms of the total money charge for the call, as well as the record of the called office code, the called subscriber's number and the date.

However, it must be realized that since the translator contains a punching machine for each line in one-half of a line-finder frame, that is, two hundred punching machines, a similar record is made for each line without any indications on the secondary tape to distinguish one secondary tape from another. But each secondary tape must be identified with the subscriber to which it appertains because the printing tabulator, as described hereinafter, must receive some signal which marks the subscriber to which the particular secondary tape belongs.

The description of how and what forms the substance of this indication has been postponed, however, until the making of the secondary tape had been described since the perforation of the required information to indicate the subscriber's directory number is likewise based on the punching of a code which indicates that number. In point of time, however, and as already indicated, this information is punched on the secondary tape before any of the calls are recorded thereon.

As previously pointed out, the perforated record of all calls for the entire subdivision of two hundred lines on the primary tape gives the calling party's line-finder terminal number but not his telephone number, the relation between one and the other being purely arbitrary. It is, however, customary to handle the subscriber's account by his telephone number and consequently it becomes necessary to translate the line-finder terminal-number into the subscribers' directory number for accounting and billing purposes.

The record of the line-finder terminal-number, the telephone number and class of service to which the line is entitled is kept in the wire chief's department. From this information a "master record" is prepared on a tape of the same width as the primary tape and with the same code perforations and the same spacings as the primary tape. The master record contains the line-finder terminal-numbers of two hundred subscribers' lines in the code previously described and on the same lines therewith the directory numbers of said subscribers, with a last entry to denote the class of service or calling zone to which the lines are entitled, all in the same code. For purposes which are described hereinafter, the perforations comprising the line-finder terminal-number appear in the same corresponding positions as the perforations of said number on the primary tape, i. e., positions 1 to 11; the perforations comprising the code of the corresponding directory number, however, are punched in punch positions 24 to 43, inclusive, of the primary tape, while those relating to the calling zone are punched in punch positions 46 to 48, inclusive, of the primary tape. Since these positions in the primary tape are used respectively, for perforating the directory number of the called subscriber and the ten-minute intervals of elapsed conversation time, it is obvious that the directory number and class of service of a calling subscriber can likewise be punched thereon to effect the same reperforating equipment in the secondary punch machine. Therefore in addition to and preceding the perforations of the called number and elapsed time interval of the first call there may be recorded in the punch positions allotted therefor, and in the same code, the directory number and the calling zone of the entire calling line group.

The master record above referred to may be perforated by a hand-operated perforating machine or by any other suitable means. The line-finder terminal code, for instance, may be perforated on the master record blank by means of a permanent die, these perforations being the same for all master records since each master record, so far as line-finder terminal number arrangements are concerned, is the same for each half of a line-finder frame.

The master record tape only needs to be prepared by hand initially. But at each billing period it must be brought up to date. Where changes are required between line-finder terminals and directory numbers, they may be made by pasting a strip of paper over the telephone number and then reperforating this tape to indicate the new number. In the case of a "take-out" the covering of the telephone number perforation with a blank strip of paper will suffice.

Prior to running the primary tape of a particular group of lines through the translator, the master record tape is run fast. As the line-finder terminal number code perforations for each subscriber's line become coincidental with the tracker holes of the pneumatics in the translator which are responsive to the line-finder terminal numbers, the particular multi-contact relays, such as relay 3800, appertaining to the secondary punching machines of said line-finder terminal numbers are operated as already described to associate the proper secondary punching machines with the translator. Simultaneously therewith the perforations in positions 24 and 43 comprising the directory numbers of the calling subscribers corresponding to the line-finder terminal numbers become coincidental with the tracker holes of the pneumatics responsive to the code perforations of the called subscriber's number and, through operations in the translator already described, the codes of said directory numbers are perforated on the secondary tapes as the first item on said tapes and in punch positions 16 to 35 thereof, that is, in the same punch positions in which the numbers of the several called subscribers will subsequently appear, ground for the punch magnets being connected over the right back contact of relay 3626 to conductor 3813. Assuming that there are three zones, then, when the master record has advanced to the last or zone perforation the calling zone perforation is made in either position 46, 47 or 48, and results in the operation and locking of relay 3926, or 3927 or 3928 as already described followed by the operation of relay 3626 which removes the ground from conductor 3813. Where the number of zones exceeds three, then the perforations may be made in a code suitable to the registration of each of the entire number and the number of zone relays and zone switches shown in Fig. 10 may be increased in conformity therewith.

As the punched holes of the master tape are followed by an intervening space of unpunched tape, the secondary punching machine appertaining to the particular line-finder terminal number releases as already described. The succession of the next transverse series of punches relating to another line-finder terminal number and its corresponding directory number then causes the selection of the secondary punching machine appertaining to this next line-finder terminal number. In this manner, the master tape operates the translator and causes it to select, in succession, each one of the two hundred secondary punching machines for perforating on each of their secondary tapes the telephone number of each of the corresponding two hundred appertaining lines. The first line perforations of the secondary tape record, therefore, the directory number of the calling subscriber.

Just before the master record tape has been completely run through, the individual primary tape to which said master record appertains is then inserted and run through the translator to record on the separate secondary tapes all of the calls made by the separate subscriber in the line group, as already described, care being taken that ground on conductor 3934 is not disturbed by any false release of switch 3700.

The secondary tape is assumed to contain a record of all local and toll calls for a billing period made from the station to which the tape appertains. Consequently, when the tape is completed it is in readiness ready for passage through the printing tabulator which is responsive to the perforations denoting the several calls. The tabulator, through its operation, adds up the local calls in the equivalent number of local charge units and prints the total charges therefor on what may be called the "local service charge" bill. It further prints an itemized list of all toll calls on a separate slip together with their individual charges and finally prints the total of these charges.

Any commercial printing tabulator, or electric typewriter, with an adding attachment capable of performing the above functions is contemplated for use with the individual record prepared by the translator. In the divisional application above referred to, one specific form of a tabulator, adapted to respond to the records, is disclosed but, no doubt, other forms of devices responsive to card perforations may be modified to carry out the tabulating and printing functions designated by the perforated record.

What is claimed is:

1. In a billing system for the automatic tabulation of a plurality of charges for a plurality of calls completed from and assessable to a plurality of lines of an automatic telephone system in response to the sensing of a continuous record of the designations of said calls, each of said designations comprising a plurality of groups of notations one of which is instrumental in determining a charge rate and another the duration of a call, a translator comprising a mechanism for sensing said record, a recording mechanism and a translating computer, said computer comprising a relay for each of a plurality of different charge rates, a plurality of groups of charge conductors controlled by said relays, a plurality of multicontact relays to which each group of conductors is extended, means operative in response to the sensing of said one group of notations for operating one of said charge rate relays for making the correspondingly controlled group of charge conductors electrically responsive, means responsive to the sensing of said other group of notations for operating one of said multicontact relays, and means controlled by the operated multicontact relay to extend said group of charging conductors to said recording mechanism for operating the same to record the complete charge for a call.

2. In a billing system for the automatic tabulation of a series of transactions chargeable to a plurality of different accounts in response to the sensing of a continuous record of the designations of said plurality of transactions, each of said designations comprising a plurality of groups of notations one of which identifies the correlated account and others of which are instrumental in determining the charge rate and the elapsed time applicable to a transaction, a translator comprising means for sensing said record, a recording means for each of said accounts, means responsive to the sensing of the group of notations of a designation which identifies the account to which a transaction belongs for selecting the one of said recording means appertaining to said account, a translating computer, said computer comprising means responsive to the sensing of the group of charge rate notations of the designation, and means responsive to the sensing of the group of elapsed time notations of the designation, and means jointly controlled by said two last mentioned means for operating the selected recording means for making a record of the total charge for the transaction.

3. In a billing system for the automatic tabulation of a series of transactions chargeable to a plurality of different accounts in response to the sensing of a continuous record of the designations of said plurality of transactions, each of said designations comprising a plurality of groups of notations one of which is instrumental in determining a charge rate and another the elapsed time for a transaction, a translator comprising a mechanism for sensing said record, a recording mechanism and a translating computer comprising a relay for each of a plurality of charge rates, a plurality of groups of charge conductors controlled by said relays, a plurality of multicontact relays to which each group of conductors is extended, means operative in response to the sensing of said one group of notations for operating one of said charge rate relays for making the correspondingly controlled group of charge conductors electrically responsive, means responsive to the sensing of said other group of notations for operating one of said multicontact relays, and means controlled by the operated multicontact relay to extend said group of charging conductors to said recording mechanism for operating the same to record the complete charge for the transaction.

4. In a billing system for the automatic tabulation of a plurality of charges for a plurality of calls completed from a plurality of lines located in different calling zones of an automatic telephone exchange system in response to the sensing of a continuous record of the designations of calls made by a plurality of lines located in any one of said zones, each of said designations comprising a plurality of groups of notations for each call for identifying the calling line, the called line and the duration of the call, a translator comprising means for sensing said record, a recording mechanism for each of said lines, means responsive to the sensing of the notation in each call designation which identifies the calling line for selecting the recording mechanisms correlated to said line including a group of recording magnets, a first group of conductors for determining the various charge rates to be applied to different calls, means responsive to the sensing of a called number designation of a call for establishing a partial electric path to each of a plurality of said conductors to apply a specific charge rate for said call, a second group of conductors for determining the number of times said charge rate shall be applied for said call, means responsive to sensing the call duration designation of said call for completing said electric paths over conductors of said second group to magnets in said selected recording mechanism for recording a definite charge for said call.

5. In a billing system for the automatic tabulation of a series of transactions chargeable to a number of different accounts in response to the sensing of a continuous record of the designation of each transaction in the series, each of said designations comprising a first group of notations that identifies the correlated account, a second group that identifies the base charge rate applicable to the transaction, and a third group that identifies the time units applicable to said transaction, a translator comprising means for sensing the designations on said record, a recorder for each of said accounts, means operative in response to the means for sensing the group of notations that identifies the account for selecting the recorder appertaining to said account, a first energizable means operative in response to the means for sensing the group of notations that identifies the base charge rate applicable to the transaction, a second energizable means operative in response to the means for sensing the group of notations that identifies the time units applicable to said transaction, a plurality of conductors extending between said first and said second energizable means, and means for establishing electric circuits over said conductors for operating said selected recorder to record the total charge for said transaction as determined by the operation of said first and said second energizable means.

6. In a billing system for the automatic tabulation of charges for a plurality of calls completed from the lines of an automatic telephone system divided into a plurality of calling zones in which the numerical designation, the directory number and the zone of each of said lines is recorded by separate groups of notations on a first continuous record and the numerical designation of each of said lines when calling, the office of the called line and the duration of the conversation for each call are recorded by other groups of notations on a second continuous record, a translator for producing an individual record for each line comprising means for sensing the notations of said records, a line recorder for each line, means operative in response to the means for sensing the group of notations on said first record which indicates the numerical designation of a line for selecting the recorder appertaining to said line, said means being similarly responsive to the sensing of the identical group of notations on said second record for again selecting the same line recorder, means operative in response to the means for sensing the group of notations on said first record which indicates the directory number of said line for operating said line recorder to record said directory number, a first energizable means operative in response to the means for sensing the group of notations on said first record which indicates the zone of a line, means for locking said first energizable means, a second energizable means operative in response to the means for sensing the group of notations which indicates the called office of a call and controlled through said locked first energizable means for determining the base rate to be applied to said call, a third energizable means operative in response to the means for sensing the group of notations which indicates the duration of the call for determining the number of times said base rate shall be applied to said call, a plurality of conductors extending between said second and said third energizable means, and means for establishing electric circuits thereover for operating said selected line recorder to record the total charge for a call as determined by said second and third energizable means.

7. In a billing system for the automatic tabulation of charges for a plurality of calls completed from the lines of an automatic telephone system divided into a plurality of calling zones in which the zone of each line group is recorded by a separate group of notations on a first continuous record, and the numerical designation of each of said lines, the office of the called line and the duration of the conversation for each call made from said lines are recorded by other groups of notations on a second continuous record, a translator for making a continuous record for each line of all calls completed therefrom comprising means for sensing said records, a manually operable switch for each zone, the one switch corresponding to the zone notation on said first continuous record being operated prior to the sensing of said record, zone identifying means operative in response to the means for sensing the zone notation of said first record, a first energizable means operative in response to the means for sensing a called line notation of said second record, a second energizable means jointly controlled by said operated manual switch and said operated zone identifying means and responsive to said first energizable means for determining the base charge rate applicable to said call, a third energizable means operative in response to the means for sensing the call duration notation of said second record, a plurality of conductors extending between said second and said third energizable means, and means controlled over said conductors for recording the total charge for the call.

CHARLES L. GOODRUM.
EDWARD E. HINRICHSEN.
LEO KELLER.